June 5, 1945.     C. D. LAKE     2,377,791
SERIAL PUNCHING AND CARD COUNTING APPARATUS
FOR USE WITH PERFORATING MACHINES
Filed Dec. 8, 1943     8 Sheets-Sheet 1

FIG.1.

INVENTOR
Clair D. Lake
BY
W. J. Wilson
ATTORNEY

June 5, 1945.   C. D. LAKE   2,377,791
SERIAL PUNCHING AND CARD COUNTING APPARATUS
FOR USE WITH PERFORATING MACHINES
Filed Dec. 8, 1943   8 Sheets-Sheet 3
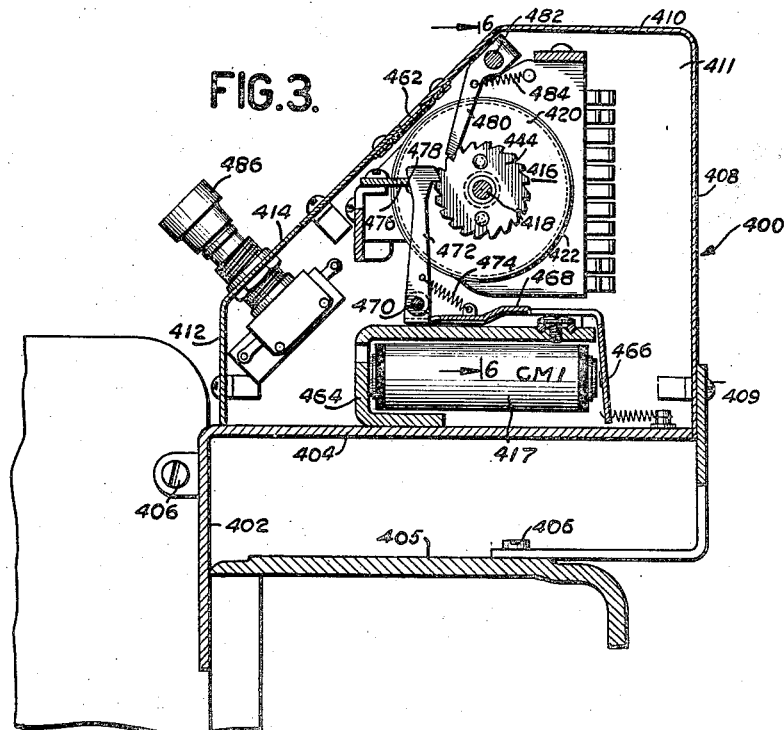
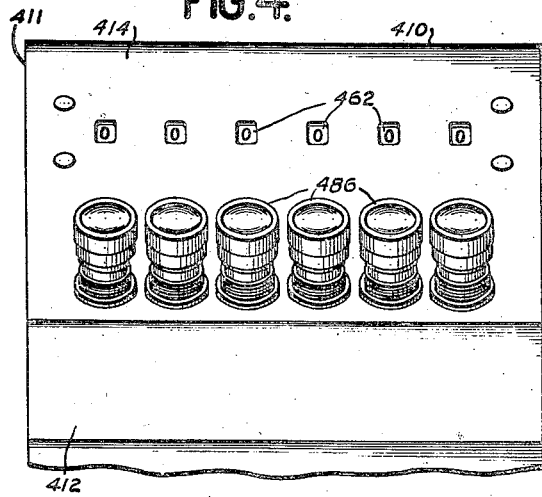
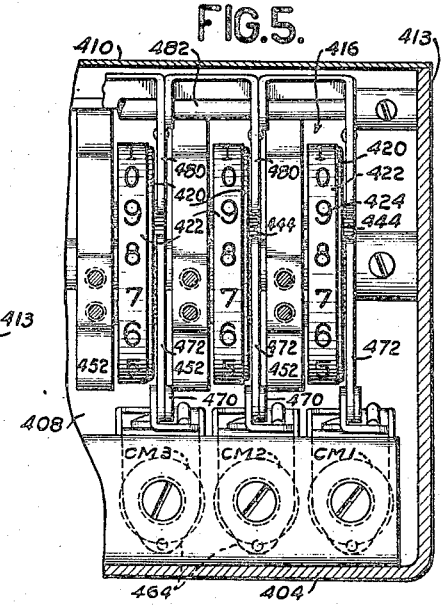
INVENTOR
Clair D. Lake
BY
W. N. Wilson
ATTORNEY June 5, 1945.　　　　C. D. LAKE　　　　2,377,791
SERIAL PUNCHING AND CARD COUNTING APPARATUS
FOR USE WITH PERFORATING MACHINES
Filed Dec. 8, 1943　　　　8 Sheets-Sheet 4
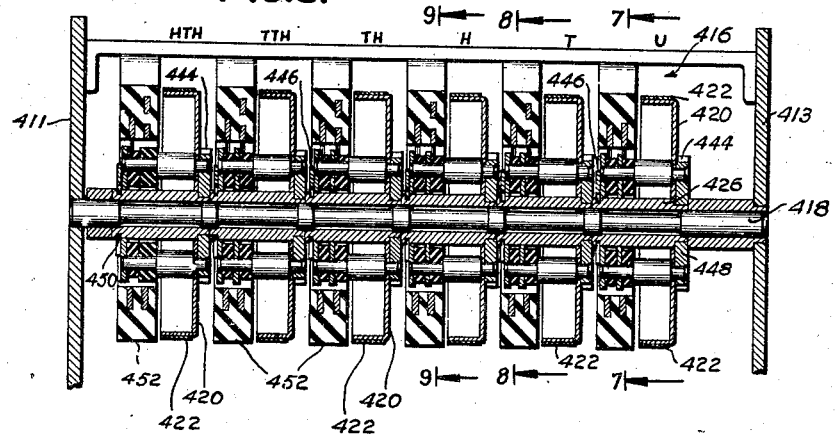
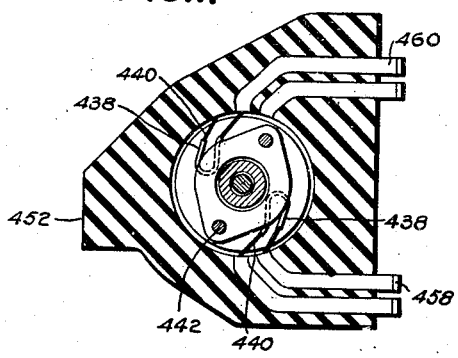
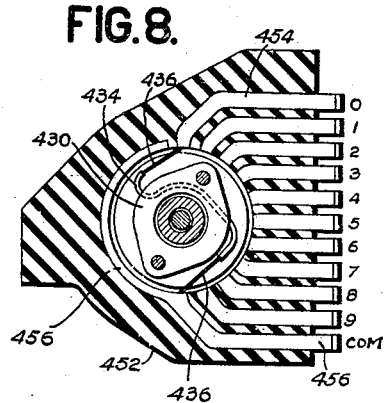
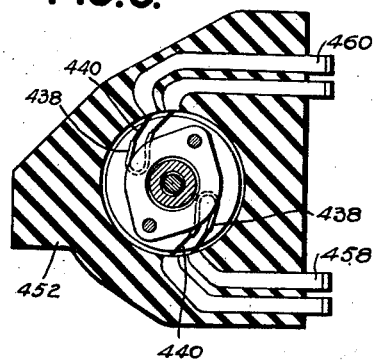
INVENTOR
Clair D. Lake
BY
W. M. Wilson
ATTORNEY June 5, 1945.                    C. D. LAKE                    2,377,791
             SERIAL PUNCHING AND CARD COUNTING APPARATUS
                    FOR USE WITH PERFORATING MACHINES
                       Filed Dec. 8, 1943           8 Sheets-Sheet 7
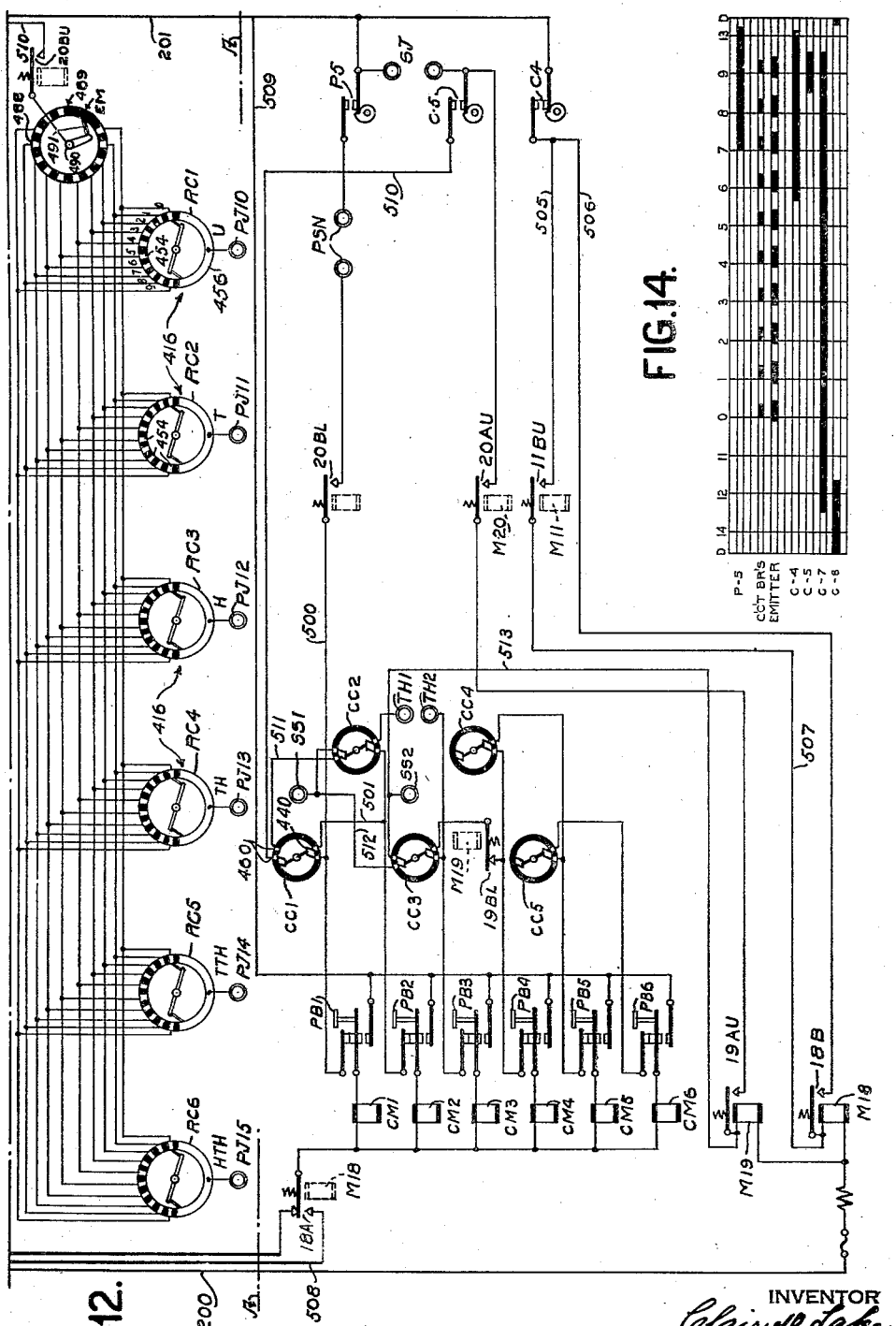

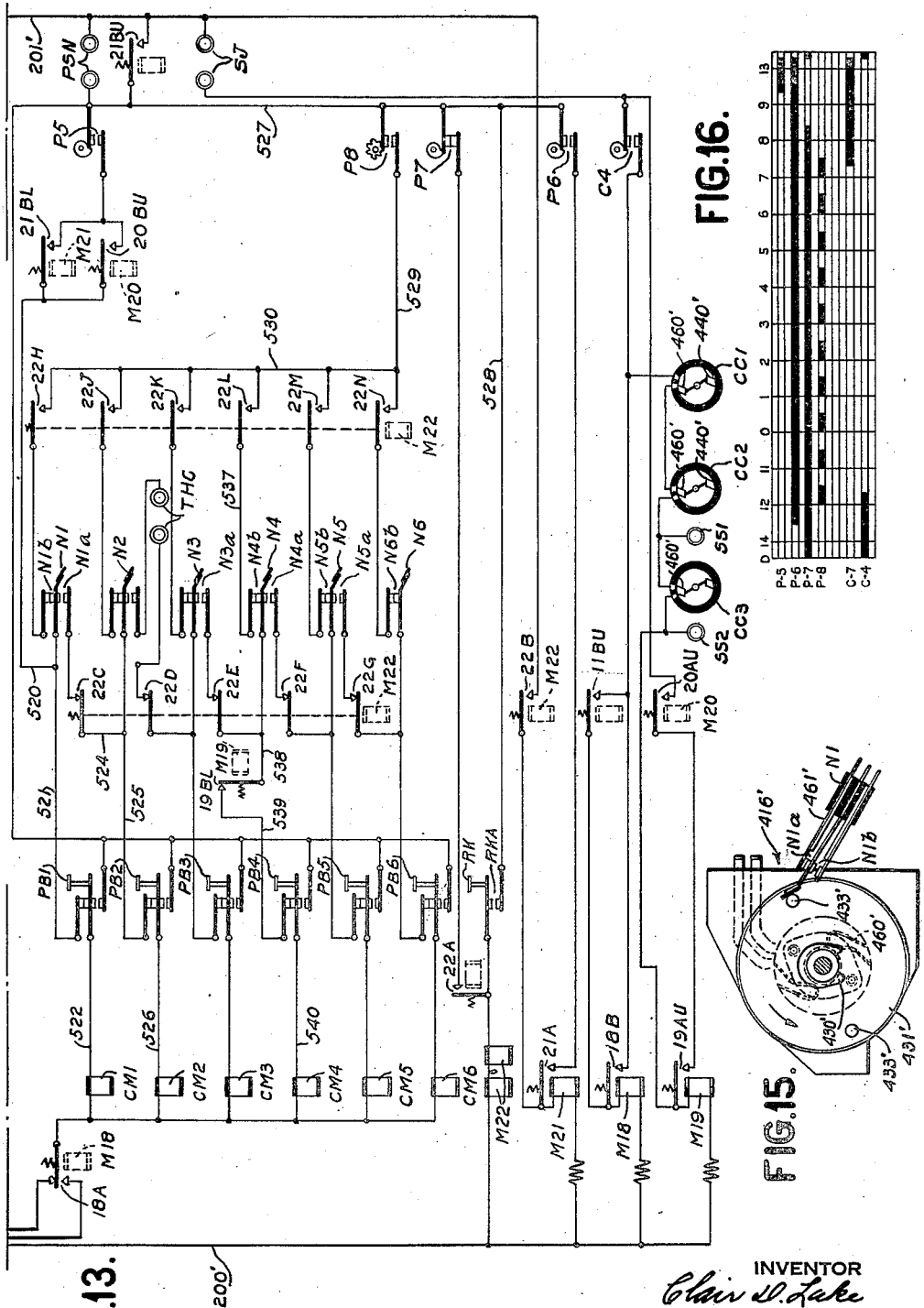

Patented June 5, 1945

2,377,791

UNITED STATES PATENT OFFICE 2,377,791

SERIAL PUNCHING AND CARD COUNTING APPARATUS FOR USE WITH PERFORATING MACHINES

Clair D. Lake, Binghamton, N. Y., assignor to International Business Machines Corporation, New York, N. Y., a corporation of New York Application December 8, 1943, Serial No. 513,361

17 Claims. (Cl. 164—115)

The serial character punching and card counting apparatus comprising the present invention is primarily adapted for use in connection with card perforating machines of the type shown and described in my prior U. S. Patent No. 2,032,805, granted March 3, 1936, and is designed as an attachment to existing machines of this general nature.

It is frequently desirable to have serial numbers represented upon cards that are otherwise punched or operated upon in a perforating machine, such as the high-speed reproducing perforating machine shown in my prior patent referred to above. Toward this end, the present invention contemplates the provision of an apparatus which will effect such serial representation automatically with but slight modification of the original perforating machine.

This, the principal object of the invention, is carried out by the provision of a series of registering counters, each representing a different digital order of a current serial number to be represented upon a card, which counters are visible to the operator of the machine and are operated electrically by instrumentalities under the control of cards passing through the perforating machine. Associated with each counter is a series of electrical read-out circuits which are selectively operable upon energization thereof to cause operation of corresponding punch-actuating instrumentalities for perforating the cards serially in the columns thereof which are selected for serial punching.

The present serial punching apparatus is capable of other uses, among the most important of which is its use in connection with perforating machines of the type set forth above as a means for automatically stopping the machine when a predetermined number of cards have been fed through the latter and operated upon by the punch instrumentalities. The apparatus is capable of such use without any modification thereof whatsoever other than the performance of certain circuit-changing functions by the operator of the machine and, when the apparatus is so used, its normal serial punching operations are inoperative or not as desired.

An additional object of the invention is to provide means whereby the various punch-controlling registering counters may individually be set to any desired indication, each independently of the others by the simple expedient of manually and repetitiously depressing a corresponding reset key, in order that serial number punching of the cards passing through the perforating machine may commence with a selected serial number.

A still further object of the invention, in a modified form thereof, is to provide means whereby the registering counters may collectively be reset to their zero indication by the simple expedient of manually depressing a single reset key.

Perforating machines of the type set forth in my above mentioned patent are capable of various types of perforating operations, and reference may be had to this patent for a full description of all the uses to which the machine may be put. Briefly, however, such machines are capable of, and may be conditioned for, simple reproducing wherein record cards are fed in synchronism from two feed hoppers. One hopper contains the master, pattern or original cards, which are already perforated, and the other hopper holds the blank or detail cards which are to be perforated to correspond to the original cards. As the cards are fed from the hoppers, a master card and an associated detail card are moved in synchronism through a sensing station and a punching station respectively and, by means fully set forth in the above mentioned patent, the perforations appearing in the master cards at the sensing station are reproduced in the detail cards at corresponding positions therein at the punching station, both the sensing and punching operations taking place simultaneously in successive transverse lines of index point positions in the respecitve cards.

The first line of index points sensed on the master card may contain a special perforation to exercise special controls, such as class selection wherein data on one field of the master card is directed to either of two fields on the detail card, class elimination wherein data on the master card is eliminated from the detail card, or field selection wherein data appearing in either of two fields on the master card is directed to a single field on the detail card, all as described in the above mentioned patent.

The machine may be conditioned for gang punching wherein a perforated master card is placed at the bottom of the hopper beneath a stack of detail cards which are to receive the data appearing on the master card. The master card is then fed through the punching station and over to the sensing station. The first detail card following the master card is fed through the punching station to the sensing station. The punches are operated under control of the sensing brushes to punch the detail card as a duplicate of the master card. This operation continues as the following cards are fed through the sensing station to the punching station, the cards being punched successively to correspond to the next preceding card so that in the end all cards will be similarly punched.

The machine may be conditioned so that a number of master cards may be interspersed between the detail cards for successive gang punching operations of more than one group of cards in a single stack thereof. In such an instance, the master card is provided with a special perforation in a selected column thereof which operates to control devices for discontinuing or disabling punching between groups while the incoming master card passes through the punching station untouched and over to the sensing station.

The machine may also be conditioned for combined gang punching and reproducing control operations. In such instances, the detail cards are perforated with data from two sources, namely, the master card which precedes them and the detail cards which accompany them. Several groups of detail cards may be gang punched with continuous feeding without stopping the machine when each interspersed master card is encountered. Such functions are made possible because, when a master card is encountered ahead of the punching station, control is exercised by a special perforation in this card to hold up the feeding of cards for one card feeding cycle to allow the master card to proceed to the sensing station before combined gang punching is continued.

The improved serial punching apparatus of the present invention is capable of performing its serial punching operations on successive cards fed through the punching machine when the machine is conditioned for any of the above described functions. It is, therefore, an object of the invention to provide an apparatus of the type set forth above and having registering counters for controlling the punch instrumentalities of the perforating machine which are indexed one digit each time a detail card is fed from the hopper containing it, in order that the control exerted upon the punching instrumentalities at the time of the punching of the next detail card will result in the serial punching of that card with the next higher digital number. It is also an object of the present invention to provide an apparatus of this character wherein when master cards are interspersed between the various detail cards contained within the hopper the counters are actuated so that serial punching of the master cards when they are encountered will be eliminated and subsequently resumed when the next detail card is fed from the hopper, in order that the detail cards of the various groups may have represented thereon an uninterrupted sequence of serial numbers.

The master cards which are interspersed between the detail cards for successive gang punching operations of more than one group of cards sometimes contain a special perforation to exercise the special functions above outlined. These special perforations are commonly referred to as "X"-perforations and they may appear in any desired column of index point positions. Where these special perforations appear in the master cards they are absent in the detail cards. Sometimes the master cards may be identified by the absence of an X-perforation in the selected column, while the detail cards are identified as containing such an X-perforation in a selected column. It is a further object of the invention to provide a serial punching apparatus in which two types of control may be exerted thereover to accommodate master cards which are characterized either by the presence or the absence of special or X-perforations in a selected column thereof. According to the present invention, these two types of control are commonly referred to as "X-master" and "X-detail" respectively. It is, therefore, a similar object of the invention to provide a serial punching apparatus having provision for X-master and X-detail control as just described, in which the apparatus may be converted from one type of control to the other without necessitating modification of the apparatus and by the simple expedient of circuit alteration utilizing circuit control switches.

Yet another object of the invention is to provide a serial punching apparatus having registering control counters for the machine punching instrumentalities, including novel means whereby carry operations are effected electrically from each counter to the counter representing the next highest digital order of the serial number. According to one form of the invention, carry operations are effected by means of a novel form of carry commutator and brush unit, whereas in a modified form of the invention these carry operations are effected by a novel form of electrical transfer contact, the basic principle of accumulating remaining substantially the same in each instance.

Other objects and advantages of the invention not at this time enumerated will become apparent as the nature of the invention is better understood.

In the accompanying eight sheets of drawings forming a part of this specification, two embodiments of the invention are shown. In these drawings:

Fig. 1 is a side elevational view of a perforating machine showing the improved serial punching and card counting apparatus applied thereto.

Fig. 3 is a side elevational view, partly in section, of the improved serial punching and card counting apparatus, showing the same mounted upon a perforating machine whose operation it controls for serial number punching purposes.

Fig. 4 is a fragmentary front elevational view of the apparatus shown in Fig. 3.

Fig. 5 is an enlarged fragmentary front elevational view of the apparatus with a portion of the apparatus casing removed to more clearly reveal the nature of the invention.

Fig. 6 is a sectional view taken substantially along the line 6—6 of Fig. 3.

Fig. 7 is a sectional view taken substantially along the line 7—7 of Fig. 6.

Fig. 8 is a sectional view taken substantially along the line 8—8 of Fig. 6.

Fig. 9 is a sectional view taken substantially along the line 9—9 of Fig. 6.

Figure 10:
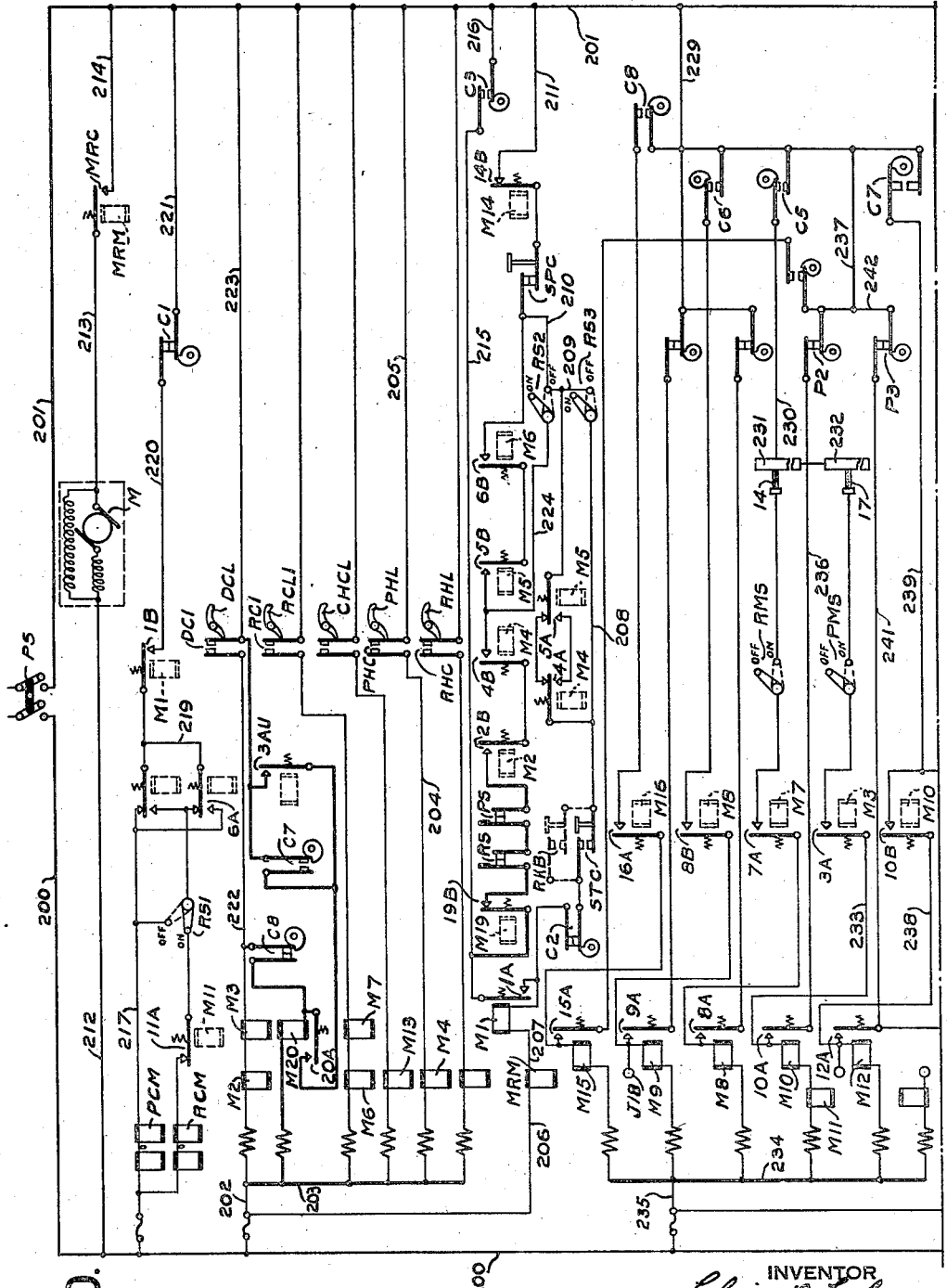
Figure 11:
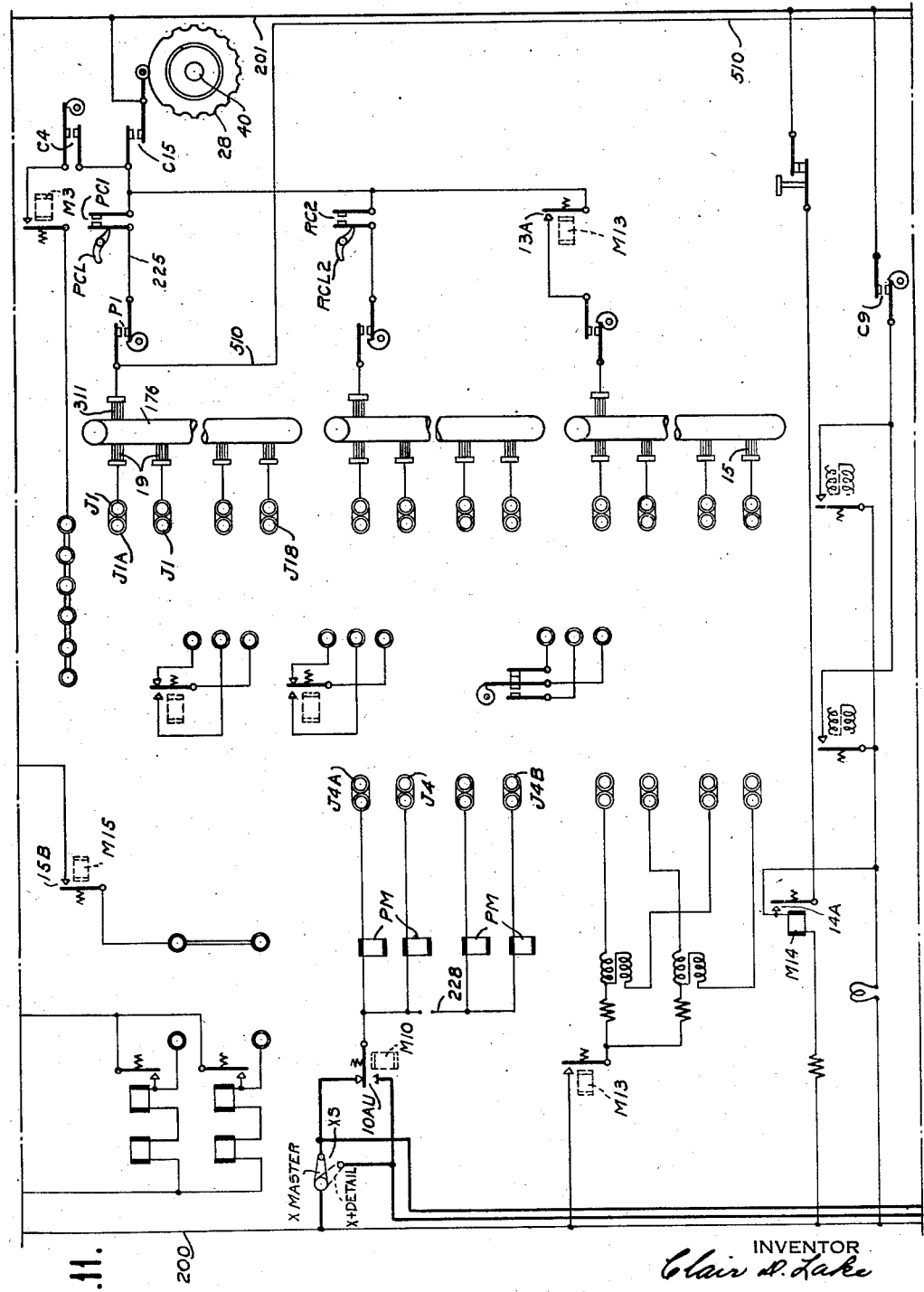

Figs. 10, 11 and 12, taken together, constitute a wiring diagram of one form of the machine.

Figs. 10, 11 and 13, taken together, constitute a wiring diagram of a modified form of the machine.

Fig. 14 represents a time chart illustrating the cyclic operation of the form of the invention shown in Figs. 1 to 12 inclusive.

Fig. 15 is a sectional view similar to Figs. 7, 8 and 9 showing a modified form of a registering device employed in connection with the present invention and utilizing electrical carry operations.

Fig. 16 represents a time chart illustrating the cyclic operation of the form of the invention shown in Figs. 13 and 15.

Figure 2:
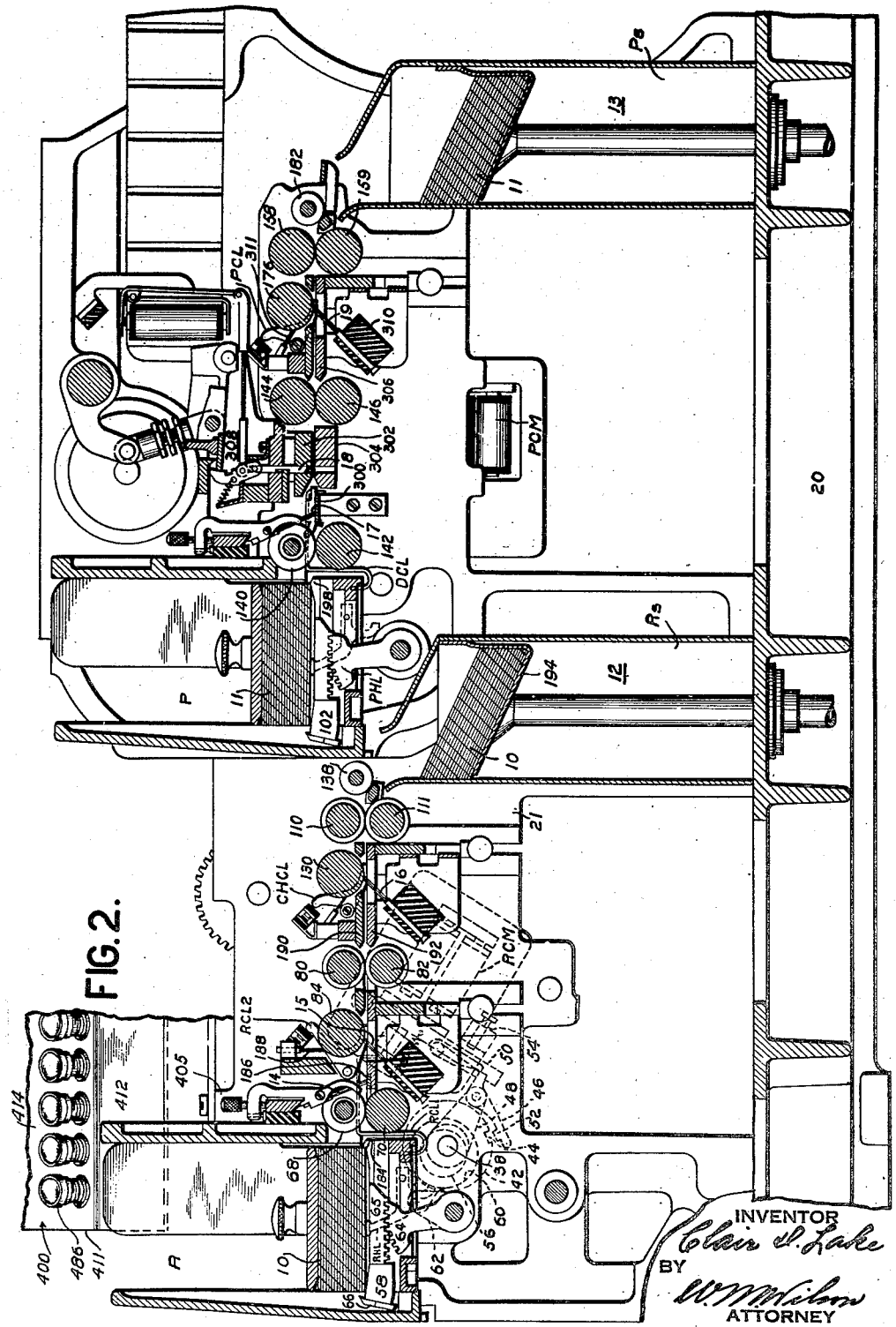
Fig. 2 is a longitudinal sectional view taken substantially centrally of the machine shown in Fig. 1.

Referring now to the drawings in detail, the essential working parts of a high-speed reproducing perforating machine constructed according to the principles set forth in my U. S. Patent No. 2,032,805 above referred to are shown in Figs. 1 and 2. Reference may be had to this patent for a full and comprehensive understanding of the various machine parts and functions thereof, as well as of the operation of the device as a whole. Briefly, however, and for the purpose of illustration in connection with the present invention, a number of master cards 10 are contained in a hopper R and an additional group of blank, record or detail cards 11 are contained in a hopper P. The cards are fed singly and concurrently from both hoppers and are then shifted in synchronism through sensing and punching stations before being deposited in stackers 12 and 13.

Upon leaving the hopper R, each master card 10 first encounters a master sensing brush 14, then a line of sensing brushes 15, and finally a series of checking brushes 16. The detail cards 11 upon leaving the hopper P each pass a master sensing brush 17, then a line of punches 18 and finally a set of checking brushes 19. The brush 14 cooperates with a special perforation in the original or master card 10 and when such a perforation is sensed a class selection operation may take place to shift the sensed data to a selected field on the record or detail card. The brush 17 is used for field selection of gang punching and also for control of suspension of master card feeding when the machine is conditioned for combined gang punching and reproducing.

Electrical connections exist between the line of brushes 15 and the line of punches 18 so that when a perforation is sensed in a master card 10, a perforation is punched in the related detail card 11 in a corresponding position. After the cards have passed the first sensing and punching stations respectively, they enter separate checking stations. In these stations the master card 10 is sensed by the checking brushes 16 at the same time that the related detail card is sensed by the checking brushes 19. If the perforations in both cards do not agree, the machine is stopped and a lamp or other signal (not shown) indicates the error.

Where straight gang punching operations are concerned, the hopper R is not used and only that section of the machine to the right of the hopper P is employed. A previously punched master card is placed at the bottom of the hopper P and from there it is fed under the punches 18 and over to the brushes 19. For gang punching operations these latter brushes have a function other than checking. They are electrically connected to the punches 18 and when a perforation is sensed in a master card or a detail card following thereafter, the next following detail card is perforated by the punches 18 to duplicate the data appearing on the preceding card. In this manner an entire group or stack of cards 11 may be gang punched under the control of the single leading master card. Where gang punching operations are performed successively upon different groups of cards, a number of master cards are interspersed in the detail record cards in the hopper P. The following operations are substantially the same as with a single group, the only difference in operation being that when an interspersed master card passes under the punches 18 such a card is not punched under the control of its preceding card 11 at the end of the preceding group. For this purpose, the master sensing brush 17 is adapted to sense special perforations appearing in the master cards and prevent punching until the master card is situated in registry with the checking brushes 19.

For combined reproducing and gang punching operations, both sections of the machine are used. The cards 11 are operated upon as previously described, the only difference being that a number of the punches 18 are controlled by the master card 10 and brushes 15, while the others of the punches 18 are controlled by the gang punching master card and brushes 19. In such an instance, only certain of the brushes 16 and 19 are used for checking purposes.

Referring now to Figs. 1 and 2 wherein the driving connections of the machine are shown, a motor M is mounted above the base 20 of the machine which also carries a pair of main side frames 21. The motor is connected by a driving belt 23 to a pulley 24 on a shaft 25 suitably mounted in bearings in the frames 21. Fixed to the shaft 25 is a gear 26 which serves to drive all of the continuously running instrumentalities of the machine. Suitable gearing designated in its entirety at 30 extends between the driving gear 26 and a relatively large punch clutch driving gear 27 which is pivoted on a punch feed drive shaft 31 and attached to another driving gear 32. Gear connections are provided between the punch clutch under the hopper P and another clutch under the hopper R so that cards may be fed in synchronism from both hoppers. The gear 32 meshes with another gear 33 pivoted as at 34. This gear 33 in turn meshes with a similar gear 35 pivoted as at 36. The gear 35 meshes with a reproducer clutch driving gear 37 mounted on a shaft 38. The gear 37 meshes with a gear 39 secured to a shaft 40 and thus this latter shaft is given a continuous movement. It is employed as a mounting for a number of cams cooperating with a series of cam contacts C1 to C10 inclusive, hereinafter referred to, and also as a mounting for an impulse distributor wheel 28 shown in Fig. 11 and which constitutes an actuating device for a pair of contacts C15, the function of which will be set forth fully hereinafter.

The gear 37 (Fig. 1) has secured thereto a clutch disc 42 (Fig. 2) provided with a notch 44. Cooperating with the notch 44 is a pawl 46 mounted on an arm 48 attached to the shaft 38. One end of the pawl is engaged by an armature latch 50 and the other end of the pawl is formed with an extension 52 adapted to fall into the notch 44. A spring 54 normally holds the armature latch 50 in engagement with the pawl 46, but when an associated magnet RCM is energized the latch is moved away from the pawl, thus connecting the shaft 38 to the driving gear 37.

The shaft 38 is provided with an eccentric 56 for operating card feed picker slides 58. Encircling the eccentric is a strap 60 which receives a reciprocating motion for each rotation of the shaft 38. The strap 60 is formed with an ear pivotally attached to an arm 62 which also carries a pair of gear sectors 64. The sectors 64 mesh with racks 65 provided on the bottom of the picker slides 58 and form a driving connection therewith. The slides 58 carry a projecting picker knife 66 which is adapted to engage the bottom card in the hopper R. It is apparent from the above described connections for the reproducer clutch that when the magnet RCM is energized the picker knife 66 is moved to the right, thus bringing the bottom master card 10 in the hopper R into cooperation with a pair of feeding rollers 68 and 70. Such a feeding action occurs during each cycle of operation when the machine is employed for straight reproducing.

The feeding rollers 68 and 70 are driven by a gear 72 (Fig. 1) mounted on the shaft 38 and in mesh with a gear 74 carried on the roller 68. A smaller gear 76 on the roller 68 cooperates with a similar gear 78 on the roller 70 so that both rollers are turned simultaneously but oppositely. The rollers 68 and 70 extend across the machine between the side frames 21 and the roller 68 is slotted at various column positions to permit proper placement of the master brush 14 in any desired position. These rollers, when turning, draw a card from beneath the hopper R and feed it to the right between the brushes 14 and 15 and over into other feeding rollers 80 and 82.

A contact roller 84 is associated with the brushes 15 and is driven by gear connections from the feed roller 68, the gear 76 on the roller 68 meshing with an idler gear 86 which, in turn, meshes with a gear 88 on the contact roller 84.

The punch clutch under the hopper P is operated when connections are established between the punch feed drive shaft 31 and the punch clutch driving gear 27. Attached to the gears 27 and 32 is a notched disc 90 which is loosely mounted on the shaft 31. Adjacent the disc 90 is an arm 92 fixed to the shaft 31 and carrying a clutch pawl 94 which is pivoted thereon. The pawl has an extension adapted to fit into the notch in the disc 90 and is normally urged into engagement with the disc by a spring 96. However, the pawl is held disengaged by an armature latch 98 which engages an extending arm on the pawl. When the punch clutch magnet PCM is energized, the associated armature is attracted and the latch 98 is rocked to the left about a pivot 100, thus releasing the pawl 94 and connecting the shaft 31 to the driving gears.

When the shaft 31 is operated, certain driving connections are rendered operative to actuate a card picker mechanism under the hopper P, which is similar to the previously described card picker mechanism under the hopper R and which is generally designated by the reference character 102. Additionally, a driving connection exists between the shaft 31 and the checking station feed rollers. A third driving connection exists between the shaft 31 and operates to release a clutch connection in a Geneva gear drive whereby intermittent motion of the card is brought about as previously described. These driving connections are not fully disclosed in the accompanying drawings, but reference may be had to my prior patent above referred to for a full disclosure thereof.

A gear 104 mounted on the shaft 31 meshes with a gear 106 mounted on the same stud 34 with the gear 33. The gear 106 meshes with a gear 108 attached to a feed roller 110. Another gear 112 on the feed roller 110 meshes with a gear 114 attached to a shaft 116 which carries a series of cams by means of which the cam contacts P1 (Fig. 11) and P2 (Fig. 10) are operated. The gear 114 meshes with a gear 118 attached to the feed roller 80 which also carries a small gear 120 in mesh with a similar gear 122 on the associated roller 82. A small gear 124 on the roller 110 drives a similar gear 126 on an associated roller 111. An idler gear 128 meshes with the gear 120 and drives a contact roller 130 through a gear 132 mounted thereon. Another idler gear 134 meshes with the gear 124 and serves to drive a pinion 136 mounted on a card deflecting eject roller 138.

A plurality of punch feeding rollers 140, 142, 144 and 146 are suitably geared and are driven from the driving gear 26 for feeding cards under the punch plungers 18. Suitable connections also extend from the gear 26 to the Geneva drive, previously referred to, for applying intermittent movement to the cards passing through the punching station. These driving connections are fully disclosed in my above mentioned patent.

The connection just referred to for the Geneva drive mechanism includes a clutch between the Geneva gear wheel proper and the feed rollers so that feeding may be prevented when cards are not to be punched. The clutch mechanism is so designed that if the magnet PCM (Fig. 1) is not energized there is no driving connection to the Geneva wheel arrangement, and if this latter magnet is energized the usual driving connection is existent. A gear 148 meshes with two gears 150 and 152 on the feed rollers 140 and 144 respectively. An idler gear 154 between the gear 152 and another gear 156 forms the driving connections over to a feed roller 158 on which the gear 156 is mounted. A small gear 160 on the roller 140 cooperates with a similar gear 162 on the roller 142. The same sort of gear connection is made between a pair of gears 164 and 166 on the rollers 144 and 146 and between gears 168 and 170 on the roller 158 and its associated roller 159.

An idler gear 172 connects the gear 164 to a gear 174 on a contact roller 176. Another idler gear 178 meshes with the gear 168 and a pinion 180 attached to a card reject roller 182. In the operation of the perforating machine, when a group of master cards 10 are placed in the hopper R, the bottom card depresses a hopper contact lever RHL closing the associated contacts RHC of Fig. 10. Subsequently, when the picker mechanism is operated the bottom card alone is forced through the throat 184 and placed between the feed rollers 68 and 70 which feed the card along the machine.

Upon entering the sensing station, the card engages and operates a card lever RCL1. At the same time the card passes between the brush 14 and a contact plate 186. From there the card passes between the brushes 15 and the contact roller 84, and at the same time operates a card lever RCL2. Common contact brushes 188 carry the sensing current to the roller 84. The brushes 15 are arranged in a single line.

The card passes on to the feed rollers 80 and 82, which feed it between a pair of guide plates 190 and 192. A card lever CHCL is operated as the card passes between the checking brushes 16 and contact roller 130. After leaving the brushes 16, the card is engaged by the rollers 110 and 111 which serve to eject the card to the stacker 12 wherein the cards are supported on the top of a depressible spring plunger 194.

The brush 14 is adjustable along the length of the card in order that it may cooperate with any column therein.

The detail cards 11 and any master cards 10 which may be placed in the hopper P follow a course through punching and sensing stations before being deposited in the stacker 13. The cards in this hopper depress the hopper contact lever PHL and close the associated contacts PHC (Fig. 10). Upon operation of the picker mechanism 102, the bottom card passes through a throat 198 and is placed between the feed rollers 140 and 142 which feed the card along between the brush 17 and contact bar 300. As the card passes, it operates a card lever DCL. The brush 17 is adjustable in the same manner as the brush 14. After leaving the master card sensing station, the card is fed between a stripper plate 302 and die plate 304 and enters between the feed rollers 144 and 146, which latter rollers feed it between guide plates 306. A card lever PCL is operated as the card passes between the sensing brushes 19 and contact rollers 176. An insulation block 310 holds contact brushes 19 in contact with the roller 176. When the card leaves the brushes it is engaged by the rollers 158 and 159 which eject it past the deflector roller 182 into the stacker 13.

The selective operation of the punch plungers, by means of mechanism designated in its entirety at 308, is fully set forth in my prior patent and reference should be had thereto for an understanding thereof. It is deemed sufficient to state that the operation of punching is timed to occur during the pause in card feeding when the Geneva drive wheel mechanism is not in action.

Circuit connections for the perforating machine shown in Figs. 1 and 2 are illustrated in Figs. 10 and 11. Reference may be had to my prior patent above referred to for a description of such circuit connections as are employed when the machine is to be used in straight card-for-card reproducing. The present description will be confined to use of the machine for straight gang punching utilizing only the hopper P, and wherein all of the cards contained in this hopper are punched according to the data appearing on an underlying master card, and for group gang punching wherein various master cards are interspersed between the detail cards for successive gang punching operations of more than one group of cards. It will be understood that the improved serial punching device comprising the present invention cooperates with the above described perforating machine in the same identical manner, regardless of whether the perforating machine is used for such gang punching, for straight card-for-card reproducing, for class selection, class elimination, field selection or for combined gang punching or reproducing control. In Fig. 10, insofar as practicable, reference characters similar to those employed in my above mentioned patent have been applied to the corresponding electrical instrumentalities in this figure. In the ensuing description, only such electrical parts as are pertinent to the invention under consideration have been referred to.

When it is desired to use the machine for straight gang punching, a master card is inserted at the bottom of a group of detail cards contained in the hopper P and all the reproducing switches RS1, RS2, RS3 and RMS are set to the "off" position because the reproducing station is not used during this type of operation. When the switch PS is closed, the machine is connected to the source of electrical energy through the two main lines 200 and 201. The cards in the hopper P actuate the lever PHL, close contacts PHC and energize magnet M4 through a circuit from the line 200, wire 202, bar 203, magnet M4, wire 204, contacts PHC and wire 205 to line 201. The start key ST is depressed and a circuit may be traced from line 200, wire 206, magnet MRM, wire 207, magnet M1, normally closed contacts C2, normally open start key contacts STC, wire 208, switch RS3 in its "off" position, wires 209 and 210, stop key contacts SPC, contacts 14B and wire 211 to line 201. The energized motor relay magnet MRM closes contacts MRC and operates the motor M through wires 212, 213 and 214 between the main lines. The other energized magnet M1 closes contacts 1A to hold the circuit for most of the cycle, and closes contacts 1B to energize the punch clutch magnet PCM. The holding circuit is traced from line 200 through wire 206, magnet MRM, wire 207, magnet M1, contacts 1A, wire 215, contacts C3 closed until near end of cycle, and wire 216 to line 201. The clutch magnet circuit runs from line 200 through punch clutch magnet PCM, wire 217, switch RS1 at "off", upper contacts 6A, wire 219, contacts 1B, wire 220, contacts C1 and wire 221 to line 201. Through the clutch connection thus made, the punch picker mechanism 102 is operated to feed the master card out of the hopper P and between the punch and die at the punching station. During this first card cycle, the card operates the die card lever DCL and closes contacts DC1, which in turn close a circuit from line 200 through magnets M2 and M3, wire 222, contacts DC1 and wire 223 to line 201.

The energized magnet M2 then closes contacts 2B and provides another holding circuit through magnets MRM and M1 to hold the same energized while contact C3 is opened. This circuit may be followed from line 200 through wire 206, magnet MRM, wire 207, magnet M1, contacts 1A, contacts 19B, stacker contacts Rs and Ps, contacts 2B, contacts 4B already closed by magnet M4, wire 224, switch RS2, wire 210, contacts SPC, contacts 14B and wire 211 to line 201. The motor M will keep running and cards will be fed from the hopper P as long as they are present or until the stop key SPC is manually depressed.

During the second card feeding cycle, which takes place automatically, the master card passes between the die and punches over to the sensing station at the same time that the first detail card immediately following the master card is moving from the hopper P to the punching station. Next, the punch card lever PCL is card operated and contact PCf is closed completing a circuit from line 201 through the impulse distributor contacts C15 which are closed to sense each index point position, through contacts PC1, wire 225, contacts P1 closed throughout punching, common contact brush 311, common contact roller 176, sensing brushes 19, plug board jacks P1, plug wires (not shown) to plug board jacks J4, through the punch control magnet PM, common bar 226, upper contacts 10AU, X-master switch XS, and line 200. The master card moves in synchronism with the detail card, the former going under the brushes 19 and the latter under punches controlled by magnets PM. All the holes punched in the master card will be punched in the detail card if the related columns are connected by plug wires.

The newly punched card is fed in turn from the punching station to the sensing station as a second detail card is fed through the punching station. Thus, the newly punched detail card acts as a master card to control the punching of the second detail card, and the second card controls the punching of the third, etc., until all of the detail cards are similarly gang punched.

The arrangement of parts thus far described is, with the exception of a few circuit changes that will be pointed out presently, more or less conventional in its design and no claim is made herein to any novelty associated therewith, the novelty of this application residing rather in the serial punching apparatus by means of which successive serial numbers are applied to successive detail cards, while at the same time these cards are perforated by the punches PM to duplicate other data appearing on the preceding cards.

If more than one group of cards, and more that one master card, are placed in the punch hopper P at one time, it is necessary to have the interspersed master cards punched with a special perforation at the 11 index point positions of the card in some predetermined column and the brush 17 adjustably set to sense that column. Then the switch PMS should be set to the "on" position. This is done to prevent the punching of an interspersed master card under control of the last card of the previous group. As the master card feeds into the punch station, the brush 17 is permitted to close a circuit early in the cycle and thereby energize the control magnet M10 through a circuit leading from line 201, wire 229, contacts C5 which become closed as the special perforation position is sensed, wire 230, contact bar 231 and the bar 232 connected thereto, brush 17, switch PMS, contacts 3A which are closed when a card is in the punching station, wire 233, magnet M10, magnet M11, bar 234 and wire 235 to line 200. The energized magnet M10 closes contacts 10A to establish a holding circuit and operates contacts 10B to set up another circuit. The holding circuit exists from line 200 through wire 235, bar 234, magnets M11 and M10, contacts 10A, wire 236, contacts P2 which are held closed until the next cycle, wire 237 and wire 229 to line 201. The energization of the magnet M11 is for the purpose of opening the contacts 11A to deenergize the reproducing feed clutch magnet RCM. This is done to prevent feeding of a detail card with a master card during combined gang punching and reproducing.

The other circuit through contacts 10B exists from line 200, wire 235, bar 234, magnet M12, wire 238, contacts 10B, wire 239, contacts C7 which are closed early in the cycle, and wire 229 to line 201. The energized magnet M12 closes contacts 12A to establish a holding circuit from line 200, wire 235, bar 234, magnet M12, contacts 12A, wire 241, contacts P3 which are held closed during the punching cycle, wire 242, wire 237 and wire 229 to line 201.

The circuits thus far described in connection with the wiring diagram of Figs. 10 and 11 illustrate the use of the apparatus where straight gang punching and group gang punching are employed. Since the operation of the improved serial numbering device comprising the present invention will be described only in connection with these two types of operations, it is deemed unnecessary to enter into a description of the various other electrical circuits and instrumentalities which are employed in straight card-to-card reproducing, class selection, class elimination, field selection, etc. Furthermore, since the serial numbering device in no manner alters the previously mentioned checking functions of the perforating machine, it is likewise deemed unnecessary to trace the various electrical circuits by means of which these checking functions are made possible. The serial numbering device operates substantially the same in all of these instances and for an understanding of the complete operation of the high-speed reproducing perforating machine under these conditions reference may be made to my prior patent above referred to.

Referring now to Figs. 3 to 9 inclusive, 12 and 13, the mechanical details of the improved serial numbering device are shown in the former group of figures, i. e. 3 to 9, while the electrical circuit connections therefor are shown in Figs. 12 and 13. Fig. 12 illustrates the circuit connections for one form of the invention wherein the electrical readout registering devices representing different digital order numbers of a serial number may be individually set, while Fig. 13 represents a modified form of the invention wherein a quick resetting feature is involved, by means of which all of these registering devices may automatically, by the simple expedient of depressing a reset key, be reset to zero indication.

Referring now to Figs. 3 to 9 inclusive, and specifically to Fig. 3, the serial number resetting apparatus involves in its general organization a box-like casing or housing 400 including a bracket 402 having a horizontal portion 404 providing a bottom wall or base and capable of being attached to a stationary portion 405 of the perforating machine by means of suitably disposed attachment bolts 406 or the like. A bracket 407 serves to support the rear portion of the housing 400 and is secured to the latter by means of studs 409. The housing 400 is provided with a rear wall 408, a top wall 410, side walls 411 and 413 respectively, a vertical front wall 412 and an inclined front wall 414 constituting the operating board or panel of the apparatus. A plurality of mechanically independent but electrically associated registering devices are each designated in its entirety at 416. These units have been labeled in Fig. 12 as RC1, RC2, RC3, RC4, RC5 and RC6, and correspond to the units, tens, hundreds, thousands, ten-thousands and hundred-thousands digits respectively of the serial numbers to be applied to successive cards passing through the perforating machine. While any suitable number of these devices may be employed, depending upon the magnitude of the highest serial number to be employed for serial numbering purposes, six such registering devices have been disclosed in the accompanying drawings and these have been additionally labeled U, T, H, TH, TTH and HTH, reading from right to left in Fig. 6, to represent the various digital orders of the serial numbers in units, ten, hundreds, thousands, ten-thousands and hundred-thousands. The units 416 are substantially identical in construction and it is thought that a description of one thereof will suffice for them all.

The units 416 are all mounted upon a common horizontal shaft 418 suitably supported across the side walls 411 and 413 of the housing 400. Each unit 416 comprises a substantially cup-shaped shell 420, the rim 422 of which has marked thereon externally in any suitable manner a number of indicia 424 (Fig. 5) corresponding to the ten numerals of the Arabic system, and thus these cup-shaped shells 420 in general resemble usual cyclometer wheels of an ordinary veeder mechanism. However, these units, instead of being mechanically coupled together for carry operations, are electrically coupled in a manner that will be made clear presently. The cup-shaped members 420, together with the read-out devices associated therewith, are each independently rotatable and each is mounted upon a sleeve member 426 which is itself rotatably disposed on the shaft 418.

Each of the three lowest denominational order read-out devices RC1, RC2 and RC3 includes a brush carrying rotor 430 having a body portion formed of insulating material in which there is embedded a brush holder 434 which carries a pair of read-out brushes 436, and a pair of brush holders 438, each of which latter holders serves to retain a pair of carry brushes 440. A pair of diametrically opposed rivets 442 project completely through a spacing disc 444, which also constitutes a ratchet wheel designed for driving or indexing purposes, the shell 420, the rotor 430 and a spacing collar 446 and serves to hold the various parts of the rotor and shell 420 together for rotation in unison. The spacing disc or gear 444 is mounted upon a reduced portion 448 provided on the sleeve 426, while the spacing collar 446 is received within a groove 450 formed in the sleeve 426. The various sleeves 426 abut against each other in end-to-end relationship and thus each of the units 416 is securely held against lateral shifting on the shaft 418. A stationary commutator 452 formed of insulating material and of ring-like design surrounds each of the rotors 430 and is provided with a series of read-out segments 454 labeled 0 to 9 inclusive in Fig. 8, and a common segment or ring 456 labeled COM, all of the just described segments being designed for cooperation with the pair of read-out brushes 436.

Upon rotation of the rotor 430 the two read-out brushes 436 travel over the ten read-out segments 454 in succession, one of the brushes cooperating with the read-out segments, while the other brush travels over and cooperates with the common contact segment or ring 456, the same sequence being repeated but with the brushes transposed during the next half revolution of the rotor 430. The various common segments 456 have associated therewith respective plug board jacks PJ10, PJ11, PJ12, PJ13, PJ14 and PJ15, which are adapted to be selectively connected to the similar punch magnet jacks J4A, J4, etc., to J4B in order that serial number punching may take place in any desired selected card column.

Referring now to Fig. 12, the corresponding commutator segments 454 of the various units 416 are all electrically connected together in common as shown in that portion of the drawing existing above the dotted line A—A and each common connection is electrically connected to a corresponding segment 488 in a stationary commutator 489 of an emitter EM of conventional design and having a rotor 490 carrying a contact brush 491 designed for successive engagement with the various segments 488. The segments 488 to which common connections are made have been labeled 0, 1, 2, 3, etc., to 9. The rotor 490 is electrically connected to one of a pair of contacts 20BU, from which contacts electrical impulses are applied to the emitter EM at the proper point in the machine cycle for transmission therethrough and through the various units 416 for proper punch operation at the desired time. The rotor 490 is adapted to be driven in timed relation to the movement of cards through the machine and, toward this end, it may be mounted upon or driven in unison with the impulse distributor wheel 28 carried upon the shaft 40.

Each commutator 452 is also provided with a pair of carry segments 458 (Fig. 9) and a pair of stop segments 460, each pair of segments being designed for bridging contact by the pair of brushes 440 for special carry and stop operations in a manner that will be set forth presently.

The two denominational order units of the read-out device representing the thousands and ten-thousands orders, namely RC4 and RC5 are not provided with stop segments 460 because in the present instance stop operations are not carried beyond the first three orders of the registering device or, in other words, no provision is made for stopping the machine to count more than 999 consecutive numbered detail cards. Similarly, the highest denominational order unit of the registering device RC6 is provided neither with stop segments 460 nor carry segments 458 inasmuch as there is no higher denominational order unit to which carry operations may be extended.

A window 462 (Fig. 3) is disposed on the inclined front wall 414 of the casing or housing 400 in register with the indicia carrying surface of each cup-shaped member 420 and the various indicia 424 are visible through these windows.

Each rotor 430, together with its indicia-carrying shell 420, is adapted to be periodically indexed under the control of an electromagnet 417, the various electromagnets for the respective units 416 being labelled CM1, CM2, CM3, CM4, CM5 and CM6 (see Figs. 3, 5 and 13).

Each magnet 417 is suitably supported in a bracket 464 (see Figs. 3 and 5) and has associated therewith a spring-pressed armature 466 suitably mounted for pivotal movement and having an arm 468 pivotally connected as at 470 to a shiftable pawl 472 designed for engagement with the ratchet wheel 444. The pawl 472 is of the presetting type, that is to say, upon energization of the electromagnet 417 it is moved bodily upwardly and in so moving it slides over one of the teeth on the ratchet wheel 444 and engages the intervening space between this tooth and its predecessor under the influence of a spring 474. Upon deenergization of the magnet 417, the pawl 472 is moved bodily downward to index the registering devices 416. A stationary plate 476 cooperates with a cam surface 478 on the pawl 472 to insure positive engagement of the pawl with the teeth of the ratchet wheel 444. A holding pawl 480 pivoted as at 482 to a stationary part of the casing 400 is normally urged by means of a spring 484 into engagement with the peripheral teeth of the wheel 444 to prevent reverse movement thereof during the presetting operation of the pawl 472.

Referring now to Figs. 3 and 4, a plurality of push buttons 486 are situated in alignment along the lower edge of the inclined front wall or panel portion 414 of the casing 400. These push buttons 486 are labeled in Fig. 12 PB1, PB2, PB3, PB4, PB5 and PB6, and correspond respectively to the various magnets 417 labeled CM1, CM2, CM3, CM4, CM5 and CM6, whose energization they control. The push buttons 486 are individually employed for resetting purposes, as will be described presently.

Referring now to Figs. 12 and 13, wherein the wiring diagrams for the two modified forms of the serial numbering devices are shown, these diagrams are somewhat similar in their nature. The wiring diagram of Fig. 12 pertains to one form of the invention wherein the push buttons 486 on the front panel 414 are selectively and individually operated for manually setting the read-out units 416 to any particular indication that may be desired for commencement of serial numbering. The wiring diagram shown in Fig. 13 is a modification of the circuit shown in Fig. 12 and includes, in addition to the six push buttons 486, an additional reset key RK which when depressed affords a means for rapidly resetting all of the registering units 416 to their zero indication. That portion of the wiring diagram of Fig. 12 which exists above the horizontal broken line A—A, is common to both modifications of the invention although it has not been included in Fig. 13 and it illustrates the various read-out circuits for the read-out or registering devices 416.

Referring now specifically to Fig. 12, when it is desired that successive cards 11 existing in the hopper P of Fig. 2 shall have numerically progressing serial numbers applied thereto as they are otherwise punched at the punching station by the punches 18, the start key ST is depressed and circuits previously described become effective to operate the perforating machine, including the punching mechanism thereof, and to feed cards from the hopper P. At the seventh or eighth index point in the first machine cycle (see Fig. 14), depending upon the presence or absence of a card in the hopper P, the card lever DCL (see Figs. 2 and 10) which is located directly ahead of the punching station, is operated and serves to close the pair of contacts DC1, thus completing a circuit from the line 201 through contacts DC1, magnets M3, M2, wire 202, to the line 200. The pair of contacts DC1 remain closed throughout the remainder of the cycle and through subsequent machine cycles as long as cards are fed to the punching station without interruption. Shortly after the thirteenth index point in the cycle (Fig. 15), a pair of cam control contacts C8 which are operated from the shaft 40 (Fig. 1) become closed and the magnet M20 (Figs. 10 and 12) is caused to shunt the already energized series arrangement of magnets M2, M3, thus energizing it also. A holding circuit for the magnet M20 is established from the line 201 through wire 223, contacts 3AU now closed, contacts 20A under control of the magnet M20, the magnet M20 itself, and wire 202 to line 200. The magnets M2, M3 and M20 remain energized as long as cards continue to be fed and until such time as the pair of contacts DC1 become again opened under the influence of the card lever DCL.

During the ensuing cycle of machine operations, while a second card is being fed through the machine, the first card passes through the punching station and is operated upon by the punches 18 in the manner previously described to apply to the card data obtained from master cards undergoing sensing ahead of the detail card whose punching operation it controls. For serial punching purposes, wherein six-digit numbers may be punched in the successive detail cards with the numbers being arithmetically advanced one unit for each card punched so that all of the cards have applied thereto consecutively numbered data, the circuit arrangement shown in Fig. 12 is utilized. At the commencement of the seventh index point in the cycle, as shown in Fig. 14, the cam controlled contacts P5 become closed, thus completing a circuit from the line 201 through the contacts P5, plug board jacks PSN which are removably connected by a plug wire, contact 20BL now closed, wire 500, normally closed contacts of the units digit push button PB1, magnets CM1, normally closed contacts 18A, X-master position of the switch XS to the line 200. It is to be noted at this point that the switch XS just referred to is interposed in the line existing between the contacts 10AU and the line 200 and is an addition to the circuit diagram for the perforating machine shown in my prior patent above referred to. This switch is designed to accommodate the X-master and X-detail control for the serial numbering device wherein the master cards are identified by the presence of an X-perforation in a selected column or the absence of such a perforation, as previously described. Upon establishment of the circuit just described, the magnet CM1 becomes energized (Figs. 3 and 12) and the pawl 472 of the units registering device 416 becomes preset. When the pair of contacts P5 become open shortly after the commencement of the thirteenth index point in the cycle deenergization of the magnet CM1 permits the spring-pressed pawl to index the unit registering device once so that during the third and following machine cycle the second detail card existing in the punching station will have applied thereto a serial number whose units digit is one unit higher than the figure for which the various registering devices comprising the counter mechanism was originally set, and which figure was initially applied to the first detail card passing through the machine.

During the first machine cycle, the magnet CM1 was unable to receive an impulse near the end of the cycle by virtue of the fact that the contacts 20BL had not become closed at the time of closing of the contacts P5. The circuit just described passing through the contacts 20BL is completed during the latter part of each machine cycle upon closing of the contacts P5, thus causing each succeeding detail card to have applied thereto by the various punches 18 a serial number which is one unit higher than the serial number applied to the preceding detail card.

In order to effect carry operations when the units digit registering device 416 passes from "9" to "0," it is obvious that the next succeeding energization of the circuit passing through the contacts P5 and 20BL must, in addition to presetting the pawl 472 of the units registerd device, also preset the pawl of the tens digit registering device. Toward this end, when the units digit registering device is positioned so that the indicia "9" appears behind the window 462, and the circuit leading to the corresponding punch magnets PM are closed by the read-out devices, one or the other of the pair of brushes 440 bridges and establishes electrical contact between the two commutator segments 458 (see Fig. 7). In such an instance, the previously described circuit existing through the cam controlled contacts P5 of Fig. 12 again become effective to energize the magnet CM1, but additionally a second and parallel circuit exists from the line 202 through the contacts P5, plug board jacks PSN, contacts 20BL, wire 500, segments 458 of the units digit carry commutator which are bridged by the brushes 440, wire 501, key control contacts PB2, magnet CM2, normally closed contacts 18A, X-master side of the switch XS to line 200. The simultaneous energization of the units and tens digit-representing magnets CM1 and CM2 respectively presets the units and tens digit-representing indicating devices 416 for subsequent indexing upon opening of the pair of contacts P5 and consequent deenergization of these two magnets.

For further carrying operations between the tens and hundreds, hundreds and thousands, thousands and ten-thousands or ten-thousands and hundred-thousands registering units 416, similar carry circuits are provided and are closed by the brushes 440 of the various commutator rotors 430 which place three, four or more energized carry circuits in parallel. The hundred-thousands digit-representing registering device 416, label CC5 in Fig. 12, is not provided with carry commutator segments inasmuch as no higher digital order exists in the serial numbering system.

For straight gang punching utilizing a single master card at the bottom of a stack of detail cards in the hopper P, the serial number registering devices 416 advance one unit or number for each card that is fed from the hopper. However, for successive gang punching operations wherein a series of master cards are interspersed at various positions between adjacent detail cards, as previously outlined, so that repetitive information may be punched in successive groups of detail cards at intervals, means are provided whereby serial number punching may be disabled or suppressed when a master card is encountered. In such an instance, the serial number registering device 416 will not be advanced until an encountered master card has passed through the punching station and the succeeding detail card is in position for punching. Thus, the detail cards in the successive groups thereof will have applied thereto an uninterrupted sequence of serial numbers.

The master cards which for successive gang punching of groups of detail cards are interspersed between the groups of such cards are, in certain instances, identified as X-master cards when a special perforation, commonly referred to as an X-perforation, appears in a selected column, such an X-perforation being absent in the detail cards. In other instances, the master cards are identified by the absence of such a special or X-perforation in a selected column with these special perforations being present in all of the detail cards. The present serial numbering apparatus is designed to accommodate both types of control which are known as X-master control and X-detail control respectively. When the switch XS of Fig. 11 is set to its X-master position, as shown in full lines, a special or X-perforation encountered by the special sensing brush 17 (Figs. 2 and 10) indicates the presence of a master card in the sensing station. In the manner previously described, punching of repetitive information into such an encountered master card is prevented, since it is desired to use that particular master card to supply repetitive information of a different nature to a new group or stack of detail cards. The master card thus encountered will not be punched by virtue of the transferring of the contacts 10AU (Fig. 11) upon energizing of the magnet M10.

When a master card identified by a special perforation in the X-column of position thereof passes through the sensing station immediately before punching operations take place, such of the magnets CM1, CM2, CM3, CM4, CM5 or CM6 as are conditioned for energization, by virtue of the setting of the carry brush in the registering devices, are energized at the commencement of the seventh index point in the cycle, thus preparing the counters for the next card to be serially punched. Slightly later in the cycle, contacts C5 become closed to complete a circuit from the line 201, contacts C5, wire 230, contact bar 231, bar 232, brush 17 now in register with the special perforation in the card, switch PMS, contacts 3A now closed under the control of the magnet M3, wire 233, magnets M10 and M11, bar 234 and wire 235 to the line 200. Magnets M10 and M11 upon thus becoming energized become locked by virtue of a holding circuit leading through the pair of contacts 10A (Fig. 10) and existing from the line 201, wires 229 and 237, contacts P2, wire 236, contacts 10A, magnets M10 and M11, bar 234 and wire 235 to the line 200. This holding circuit just described remains in force until opening of the pair of cam controlled contacts P2 shortly after the commencement of the ninth index point in the cycle in the following cycle. The magnets M10 and M11 are thus energized immediately prior to movement of the master card to the punching station and they remain energized until the master card leaves the punching station. Upon closing of the pair of contacts 11B (Fig. 12), a circuit is completed from the line 201, contacts C4 closed at this time, wire 505, contacts 11BU, magnet M18 to line 200. Such energization of the magnet M18 occurs immediately upon closing of the contacts 11BU at a point nearing commencement of the tenth index point in the cycle and deenergization of the magnet M18 takes place immediately upon opening of the contacts C4 at a point existing shortly after the commencement of the thirteenth index point in the cycle. The position of the various serial numbering registering devices are not altered at this time, inasmuch as the respective magnets CM1, CM2, etc., are already energized and are awaiting deenergization for the next successive indexing operation.

During the next cycle, when the master card is passing through the punching station, the magnet M11 remains energized, as previously described, so that when the pair of cam controlled contacts C4 became closed midway between the fifth and sixth index points in the cycle previously described, circuit connections are energized to the magnet M18 in order to close the pair of contacts 18B and form a holding circuit for this latter magnet from the line 201, through contacts C4, wire 506, contacts 18B, magnet M18 to the line 200, until the pair of contacts C4 open midway between the thirteenth and fourteenth index points in the cycle. The energization of the magnet M18 from a point midway between the fifth and sixth index points in the machine cycle to a point shortly after commencement of the thirteenth index point in the cycle, during which time the master card passes through the punching station, serves to prevent indexing of the registering devices when the pair of contacts P5 become closed. Closure of the contacts P5 at this time fails to produce energization of the respective magnets CM1, CM2, etc., by virtue of the fact that the contacts 18A are transferred from their normal position and the magnet circuits therefor no longer exist. Upon arrival of the next detail card at the punching station, the normal perforating machine circuits previously described will permit the serial number for which the registering devices 416 are set to be punched in the card since this number is the number to which the registering units were previously advanced near the end of the last card punching cycle.

For conditions of X-detail control, when utilizing master cards that are characterized by the absence of a special perforation in the selected column thereof and where the special perforations appear in the selected columns of detail cards, the switch XS (Fig. 11) is shifted to its X-detail position. As a detail card passes under the sensing brush 17 immediately prior to the cycle during which it is punched, the magnets M10 and M11 are energized immediately prior to commencement of the tenth index point in the cycle upon establishing of the circuit previously described. Closure of the pair of contacts 11BU (Fig. 12) causes energization of the magnet M18 at a point near the commencement of the tenth index point in the cycle. Such energization of the magnet M18 is brief, however, since it becomes deenergized at a point midway between the thirteenth and fourteenth index points in the cycle when the contacts C4 become open, as previously described. This last mentioned brief energization of the magnet M18 is without effect, but the fact that the magnets M10 and M11 remain energized into the next cycle renders the magnet M18 effective from a point midway between the fifth and sixth index points in the machine cycle to a point midway between the thirteenth and fourteenth index points in the machine cycle and at such time as the pair of cam controlled contacts C4 become closed. With the switch XS in its X-detail position, as shown in dotted lines in Fig. 11, the magnet circuit for the registering device is complete during that portion of the machine cycle in which a detail card passes through the punching station. The circuit exists from the line 201 (Fig. 12), through the pair of contacts P5 which close at the commencement of the seventh index point in the cycle, plug board jacks PSN connected, contacts 20BL, wire 500, the normally closed push button contacts PB1, units counter magnet CM1, normally open but now transferred contacts 18A, wire 508, X-detail side of the switch XS (Fig. 11) to line 200. It will be seen, therefore, that near the end of the card punching cycle such counter magnets as are conditioned for energization are energized, thus presetting respective registering units 416 preparatory to punching the next detail card with a serial number. The magnet M18 will become energized during each cycle at the proper time for register-advancing purposes as long as an uninterrupted series of detail cards pass to the punching station.

When a master card is encountered, the perforation appearing in the selected X-column thereof conditions the above described circuits so that the registering device is indexed for unit progression. As the detail card leaves the punching station the master card subsequently passes through the punching station but is not punched for reasons previously outlined and because of the absence of an X-perforation in this card. Inasmuch as the magnets M10 and M11 are not energized when the master cards pass under the sensing brushes, the magnet M18 remains deenergized during the time that a register-advancing impulse would ordinarily occur late in the machine cycle and during passing of the master card through the punching station. With the switch XS in its X-detail position, the contacts 18A must transfer from the position shown in Fig. 12 in order for completion of an impulse which would ordinarily advance the registering device.

As the master card leaves the punching station the next ensuing detail card passes under the sensing brushes and conditions the above described circuit so that the registering device may advance as the card nears the end of its punching cycle, it having already been punched with the serial number to which the registering device had advanced near the close of the last card punching cycle.

In the form of the invention shown in Fig. 12, means are provided whereby, utilizing the push buttons PB1, PB2, PB3, PB4, PB5 and PB6, the individual and respective registering units 416 may each be set to any desired reading for subsequent read-out purposes when cards are passed through the perforating machine. Thus, serial numbering may commence with any desired number. For resetting purposes, and with the perforating machine inoperative and the switch XS set to its master position, any one of the push buttons may be depressed to control the indexing of its respective registering device. Means are also provided for interrupting carry functions during such resetting operations in order that each push button will effect indexing of its own respective registering device and no other. For illustrative purposes, assuming that the push button PB1 corresponding to the registering device RC1 which represents the lowest digital order of a serial number is depressed, the resetting circuit for this latter degistering device extends from line 201 (Fig. 11), wire 509, normally open contacts of the push button switch PB1 now closed, magnet CM1, normally closed contacts 18A, X-master side of of the switch XS to line 200. Upon closing of the circuit just described, the magnet CM1 becomes energized and the registering device RC1 becomes preset, as previously described, so that upon releasing of the push button switch PB1 and opening of the circuit, the unit registering device is advanced one unit. Subsequent depression of the push button switch PB1 causes a repetition of the process until the desired indicia is visible in the window 462. The other higher digital orders of the registering device may be reset to any desired number in a similar manner utilizing the corresponding push buttons PB2, PB3, PB4, etc. The normally closed contacts of the various push button switches, which become open when the push buttons are depressed, interrupt the previously described carry circuits existing through the carry brushes 449 so that each circuit is complete in itself and the operator does not have to take into account carry operations when resetting the registering device.

In order that electrical interpretation of the position of each movable unit 416 of the counter registering device may take place and actuation of the punches 18 may be accordingly effected, removable plug wires are connected between the various plug board jacks PJ10, PJ11, PJ12, etc., and the punch magnet jacks J4A, J4, etc. If then, for example, the registering unit 416 corresponding to the units digit of a desired serial number is set to indicate the numeral "6" and its respective plug board jack PJ10 is connected to the plug board jack J4A in Fig. 11, a circuit exists from the line 201 (Fig. 11), through the pair of contacts C15 which close at each cycle division under the influence of the impulse distributor wheel 28, card lever contacts PC1 now closed, wire 225, cam controlled contacts P1 now closed, wire 510, contacts 20BU now closed, emitter rotor 490, emitter segment 488 labeled "6", commutator segment 454 of the registering unit RC1 labeled "6", common segment 456, plug board jack PJ10, plug wire not shown, jack J4A (Fig. 11), punch magnet PM, normally closed contacts 10AU, contacts 12B, X-master side of the switch XS to line 200. Energization of the punch magnet PM at the proper time in the machine cycle causes perforation in the detail card existing at the punching station with a hole representing the numeral "6" in the card and in the selected column thereof. The remaining columns of the card may be punched in a similar manner.

The serial numbering apparatus, in addition to its use as a control for the various punches 18 by means of which the serial numbers are applied to the cards, is capable of use as a card counting apparatus and toward this end means are provided for automatically stopping the perforating machine when a predetermined number of cards have been fed and operated upon by the usual data punching instrumentalities. However, when the apparatus is so used its normal serial punching operations are disabled and the punches 18 may operate only in their normal manner for reproducing data appearing in the master or other control cards. When used in this latter manner as an automatic stop for the perforating machine, the plug wire connecting the two jacks PSN (Fig. 12) remains in place and an additional plug wire is removably inserted between the two plug board jacks SJ. At the same time, the read-out plug wires extending from the plug board jacks PJ10, PJ11, PJ12, etc., to the plug board jacks J4A, J4, etc., are removed so that no read-out functions may be attempted. For illustrative purposes, circuit arrangements are shown whereby the machine may be stopped when any number of cards less than one-thousand have been passed through the perforating machine, the specific number being determined by the operator who manually sets a number equal to the thousands complement of the number of cards to be counted into the three lowest digital orders of the registering device, while at the same time setting the remaining higher orders to their zero indications. Thus, for example, the machine may be conditioned to permit one-hundred twenty-three cards to pass through the perforating machine and thereafter stop the machine by setting the three lowest digital orders of the registering device to 1,000 minus 123 or, in other words, 877. It has previously been described how automatic setting of these registering devices to a desired figure may be obtained by operation of the push buttons PB1, PB2 and PB3 and such use thereof is resorted to in setting the registers for automatic machine stopping functions:

Automatic stopping of the machine under the control of the units, tens and hundreds units of the registering device is performed by means of a sensing operation utilizing the previously described carry brushes 440 and the pair of previously described stop segments 460 which are mounted in the commutator 452. These latter segments are so positioned in the commutator that they are bridged by a pair of carry brushes 440 when the units digit-representing registering device RC1 stands at its "8" indication or when the tens or hundreds digit-representing registering devices RC2 and RC3 respectively stand at their "9" indication. In this manner the three lowest digital orders of the registering device may control a sensing circuit when they collectively stand at a reading of 998.

When using the apparatus in this manner, the operator places a stack of cards in the hopper P of the perforating machine and depresses the start key ST. Upon operation of the machine, the registering device will advance and perform its carry operations precisely as previously described, but serial numbers are not applied to the cards because no plug wires are provided for punching purposes. Furthermore, the numbers appearing in the register are complements which are gradually diminished by a repeated additive process. Near the end of the first machine cycle the card lever DCL of Fig. 10 closes its pair of contacts DC1 upon engagement by the first card in the series and the magnets M2 and M3 become energized in the usual manner. Shortly after the thirteenth index point in the same cycle the magnet M20 becomes energized and the pair of contacts 20BL of Fig. 12 close at a time which is too late for an impulse to proceed from the pair of contacts P5, through the normally closed contacts of the push button switches, to whatever register controlling magnets would ordinarily be conditioned to receive such an impulse. At the commencement of the second index point in the next cycle when the first card has moved into the punching station the register controlling magnets are energized for the first time by the usual impulsing circuit leading from line 201 through the cam controlled pair of contacts P5, plug jacks PSN, contacts 20BL, wire 500, push button switch PB1, magnet CM1, normally closed contacts 18A, wire 508, X-master side of the switch XS to line 200. This latter magnet CM1 is energized each cycle thereafter and carry operations take place in the usual manner. When the one-hundred twenty-first card reaches the punching station, the last impulse delivered to the register-controlling magnets leaves the register reading at 877 plus 121 or, in other words, 998 at the end of the cycle. Once each cycle during this building-up process, wherein the register approaches its final reading, the pair of cam controlled contacts C5 close in an attempt to complete what may be termed a testing impulse through the circuit, but it is not until the cycle following the passage of the one-hundred twenty-first card (i. e. when the one-hundred twenty-second card arrives at the punching station) that this testing impulse can effect completion of the circuit. As the one-hundred twenty-second card arrives at the punching station, the register stands at a reading of 998 and the stop sensing commutators 460 of the hundreds, tens and units register are so disposed that in each case a pair of carry brushes 440 will bridge the stop sensing segments. Under such conditions, a sensing circuit exists from the line 201, through the now connected plug board jacks SJ, cam controlled contacts C5 which are closed from a point midway between the eighth and ninth index points in the cycle to a point midway between the ninth and tenth index points in the cycle, wire 510, stop segments 460 of the units digit-representing registering device which are now bridged by a pair of brushes 440, wire 511, stop sensing segments 460 of the tens digit-representing registering device which are also bridged by a pair of brushes 440, wire 512, stop sensing segments 460 of the hundreds digit-representing registering device which are bridged by a pair of brushes 440, wire 513, magnet M19 to line 200.

Upon energization of the magnet M19 in the usual course of machine operations, the pair of contacts 19B (Fig. 10) which control the holding circuits for the magnets M1 and MRM become open and these latter magnets become deenergized allowing the contacts 1B and MRC to open. Consequently, the circuit which passes through the motor M and the circuit leading to the punch clutch magnet PCM become open, thus stopping the machine at the end of the last cycle during which an indexing impulse is carried to any of the register controlling magnets CM1, CM2, etc., which are conditioned to receive it. At this point, the perforating machine will stand with the one-hundred twenty-third card poised for passage to the punching station, while the registering device will stand at a reading of 999 as a result of the impulse received immediately prior to stopping of the machine. The operator may now remove any remaining cards from the hopper P and by manually depressing the start key ST allowing the machine to make three complete cycles, all of the cards previously fed from the hopper P into the machine will pass to the stacker 13, the one-hundred twenty-third card being the last to so pass.

During the first of these manually controlled card feed-out cycles, the magnet M10 (Fig. 10) remains energized inasmuch as cards still remain in the perforating machine and the card lever DCL maintains its contacts DC1 closed, while at the same time the pair of cam controlled contacts C7 remain closed to hold the magnet M20 energized a slightly longer period of time. Upon opening of the pair of contacts C7 at a point midway between the ninth and tenth index points in the cycle, the magnet M10 becomes deenergized and remains so until new cards are fed to the machine. Because of the fact that the contacts 20BL are closed during the first manual feed-out cycle, an impulse reaches the register-controlling magnets through the circuit previously described leading through the pair of cam controlled contacts P5. With the normal carry circuits in effect, the register would thus advance from a reading of 999, which was its reading at the time the machine ceased operation, to 1,000 following the first manual card ejecting cycle. Subsequent manual card ejecting cycles would ordinarily advance the registering device to 1,001 and finally to 1,002, but due to the presence of the pair of contacts 19BL (Fig. 12) in the carry circuit between the hundreds and thousands register units normal carrying operations between these two units is prevented, so that only the first manual card ejecting cycle is effective and causes the register to move to a final position at which its reading is 000000. The contacts 19BL are open at the time of the carry impulse between the tens and hundreds register units by virtue of the fact that the magnet M19 becomes energized slightly before the machine ceases to operate and establishes a holding circuit through the pairs of contacts 19AU and 20AU which remain closed until the magnet M20 becomes deenergized at the time of opening of the pair of cam controlled contacts C7 midway between the ninth and tenth index points in the cycle. During the two last card-ejecting cycles, the register controlling magnets receive no further impulses due to the deenergized condition of the magnet M20. Thus, at the conclusion of all operations the registering device stands at its 000000 reading and one-hundred twenty-three punched cards will have passed to the stacker 13, this being the desired card counting object or result.

In instances where it is desired to stop the machine when less than one-hundred cards are passed through the perforating machine, the time-consuming operations required to set up the hundreds units of the registering device to an indication of "9" may be dispensed with by bridging the plug board jacks SS1 and SS2 of Fig. 12 with a plug wire and removing the plug wire existing between the plug jacks TH1 and TH2. Under such conditions, it is only necessary for the operator to set up in the register a two-digit or hundreds complement for the selected number of cards. For example, in order to stop the machine after twenty-five cards have been passed through the machine, the one-hundred complement of twenty-five, namely seventy-five, would be set into the machine rather than the one-thousand complement of twenty-five, which would be nine-hundred seventy-five, were not the hundreds wheel eliminated by the insertion of the plug wire between the plug jacks SS1 and SS2. The automatic stopping operations of the machine remain substantially the same as above with the exception that the sensing impulse afforded by the carry brushes 440 are completed when the register stands at a position of 98 instead of at a position of 998. This condition is made possible by virtue of the fact that the plug wire extending between the jacks SS1 and SS2 affords a path for current around the stop segments 460 of the hundreds registering unit so that the position of this latter unit is without effect on the carry sensing impulse. The plug wire extending between the plug board jacks TH1 and TH2 is removed to break the carry circuit between the tens and hundreds digit-representing units so that the first manual card run-out cycle after the machine has stopped will result in a register advancing operation wherein the register advances from a reading of 000099 to 000000, instead of to 000100.

Referring now to Fig. 13, wherein a modification of the improved serial numbering device apparatus is shown, means are incorporated in this form of the invention whereby the various registering units 416', labeled CC1, CC2, CC3, etc., may rapidly be reset to their zero indication by the simple expedient of manually depressing a reset key. The mechanical and electrical features of this modified form of the invention differ somewhat from those of the form of the invention just described and among the more important existing differences between the two forms of the invention is the elimination of the segment-bridging carry brushes 460', together with the carry segments therefor and the substitution therefor of a transfer contact type of carry arrangement, such substitution being necessitated by the employment of the automatic resetting instrumentalities. The basic system of accumulating as previously described, however, remains substantially the same. The normal functions of the apparatus with respect to the electrical read-out circuits existing for the purpose of punch operations are likewise not altered, while the automatic stopping feature described in detail in connection with the other form of the invention also exists in substantially the same form.

In Fig. 13, similar characters of reference to those employed in Fig. 12 are utilized for convenience of description and in order that similar electrical instrumentalities and circuit functions between the two modifications of the invention may readily be perceived. Many of these instrumentalities are not referred to in the following description to avoid repetition.

As in the other form of the invention, the accumulating circuit becomes effective upon closure of the contacts 20BU, whereupon each time the pair of cam controlled contacts P5 become closed a circuit exists from the line 201' through the connected plug board jacks PSN, contacts P5, contacts 20BU, wire 520, wire 521, normally closed contacts of the push button PB1, wire 522, register controlling magnet CM1, normally closed contacts 18A, X-master side of the switch XS to line 200'. Thus, the magnet CM1 which controls indexing of the units digit-representing unit CC1 is impulsed once during each card cycle.

Referring now additionally to Fig. 16, carry operations are effected in a slightly different manner from that previously described in connection with the other form of the invention in that the carry function of the brushes 440' is eliminated together with the carry segments 458 employed in the form of the invention shown in Fig. 12. Instead of the brush type of carry devices there is substituted a plurality of contact groups 461' labeled N1, N2, N3, etc., and representing the various digital orders of the serial number. The rotor 430' has associated therewith a disc 431' which is rotatable in unison therewith and which is provided with a pair of diametrically opposed contact-engaging and -actuating fingers 433' designed for cooperation with the contact groups 461' when the registering unit with which they are associated stands in its "9" position to effect a circuit transfer by opening a normally closed pair of contacts N1b and closing a pair of normally open contacts N1a associated with the contact group N1. The carry circuit existing when the units digit-representing register unit stands at "9" extends from line 201' through the plug board jacks PSN, contacts P5, contacts 20BU, wire 520, the normally open but now closed contacts N1b of the group N1, contacts 22C, wire 524, wire 525, the normally closed contacts of the push button PB2, wire 526, magnet CM2, the normally closed contacts 18A and X-master side of the switch XS to line 200'. This circuit, of course, exists in parallel with the usual circuit through the magnet CM1 so that the magnets CM1 and CM2 are energized simultaneously to index both the units and tens digit-representing registering unit 416'. More extensive carry operations involving the hundreds, thousands and still higher digital orders of the registering device require no further explanation as they merely involve still further parallel circuits similar to those just described.

Automatic resetting of all of the registering device units 416' is accomplished by a single depression of the reset key RK. To effect such automatic resetting, all of the cards are removed from the feed hopper P to prevent undesired card feeding following the resetting operation after the reset button is depressed. Depression of the key RK serves to close two sets of contacts, namely RKA and RKB, this latter pair of contacts being shown in Fig. 10 in dotted lines as shunted around the start key contact ST. Thus, depression of the reset key has the same effect as depression of the start key and when it is so depressed the machine will commence to run. The other pair of contacts RKA shown in Fig. 13, when closed, establish a circuit from the line 201', plug board jacks PSN, wire 527, wire 528, contact RKA, magnet M22 to line 200'. Energization of the magnet M22 closes a pair of contacts 22A, thus providing a holding circuit for the magnet until midway between the eighth and ninth index points in the first cycle. Simultaneously, contacts 22C, 22D, 22E, 22F, 22G are opened under the influence of the magnet M22. These contacts, when opened, interrupt all carry operations and serve to electrically isolate the counters from one another so that carry functions will not occur during resetting of the counters to destroy the ultimate zero reading thereof. At this time, and also under the influence of magnet M22, contacts 22H, 22J, 22K, 22L, 22M and 22N become closed and provide a reset impulsing circuit for each of the magnets CM1, CM2, CM3, etc., which resetting impulsing circuits receive their impulses simultaneously.

Upon energization of the magnet M21, when the pair of cam controlled contacts P6 become closed, contacts 21A close to hold the magnet energized until shortly after the commencement of the thirteenth index point in the cycle. Thus, for example, if the units digit-representing registering unit 416' stands at "5" at the commencement of the reset cycle which is initiated by depression of the reset key RK, a circuit exists upon closure of the cam controlled pair of contacts P8 at the commencement of the twelfth index point in the reset cycle from line 201' through the plug board jacks PSN (or contacts 21BU if no plug wire is present), contacts P8, wire 529, wire 530, closed contacts 22H, normally closed contacts N1a of the group N1, wire 521, normally closed contacts of the push button PB1, wire 522, magnet CM1, normally closed contacts 18A and X-master side of the switch XS to line 200'. Upon energization of the magnet CM1, the units digit-representing section of the registering device will become preset and, upon opening of the pair of contacts P8 midway between the twelfth and thirteenth index points in the cycle, it will be advanced to its "7" indication. The next impulse advances this unit to its "8" indication and the following impulse at the commencement of the first index point in the cycle leaves the unit at a reading of "9". No further impulses will affect the unit because as it attains its "9" indication the finger 433' engages the contact group 461' to shift its carry contacts and open the above mentioned impulsing circuit.

Simultaneously, all of the other units, that is, all those which do not stand at a reading of "9," are impulsed through parallel resetting circuits which, for example, in the case of the thousands digit-representing unit extends from the line 201' through the plug board jacks PSN (or contacts 21BU), wire 527, cam controlled contacts P8, wire 529, wire 538, contacts 22L now closed, wire 537, normally closed contacts N4a of the contact group N4, wire 538, contacts 19BL now closed, wire 539, normally closed contacts of the push button PB4, wire 540, magnet CM4, normally closed contact 18A, X-master side of the switch XS to line 200'. Each time the pair of cam controlled contacts P8 become closed and open again, the impulse to the thousands digit-representing unit is repeated as in the case of the units digit-representing unit until the wheel stands at its "9" position, at which time the transferring of the contacts of the group N4 prevents further impulses from being received from the contacts P8. As a result of all these cyclic impulses, all of the counter wheels will ultimately arrive at their "9" position prior to commencement of the seventh index point in the cycle. With the counter thus reading 999999, it is then merely necessary to add one into the units position of the register and rely on normal carrying operations to move the counter to 000000. At a point midway between the eighth and ninth index points in the cycle, the pair of cam controlled contacts P7 open, thus breaking the holding circuit for the magnet M22 which returns all of its controlled contacts 22C to 22G inclusive to their normal positions, thereby restoring the normal carry circuits. At the same time, the magnet controlled contacts 22H to 22N inclusive become open to destroy the previously described impulsing circuits. Shortly after the commencement of the ninth index point in the cycle near the end of the reset cycle, a circuit leading from line 201', plug board jacks PSN (or contacts 21BU, still closed), cam controlled contacts P5 which close shortly after the ninth index point in the cycle, contact 21BL now closed, wire 520, wire 521, normally closed contacts of the push button PB1, wire 522, magnet CM1, normally closed contacts 18A, X-master side of the switch XS (Fig. 11), to line 200' is closed. Simultaneously, parallel carry circuits are available for the magnets CM2, CM3, CM4, CM5 and CM6 by virtue of the transfer of the carry contacts N1a to N6a inclusive. These latter carry circuits are identical with those employed in normal accumulating, as previously described. When the cam controlled contacts P5 open shortly after the commencement of the thirteenth index point in the cycle near the end of the reset cycle, all of the register units 416' are indexed to advance, thus changing the counter reading from 999999 to 000000. Shortly after the commencement of the thirteenth index point in the cycle, the holding circuit for the magnet M21 is interrupted and the machine comes to rest midway between the thirteenth and fourteenth index points in the cycle with the register standing at its zero indication and all circuits normal preparatory to further machine operations.

Throughout this specification and in the ensuing claims the term "master card" is employed to designate an original, completely punched card, the pattern of which, or a portion of the pattern of which, is to be reproduced on a detail card, whether this detail card be present in the perforating machine under conditions of card-for-card reproduction, gang punching, combined gang punching, gang punching and reproducing control operation or other types of operation. The term "pattern card" is employed herein to designate any control card whatsoever, whether this card be a master card or a detail card which has been punched as a duplicate of a preceding master card in a gang punching operation and which subsequently serves as a pattern for further punching operations on the next succeeding unpunched detail card. The term "detail card" is employed herein to designate a card which exerts no control operations in the machine and which is merely punched under the control of a pattern card preceding it in a gang punching operation or a master card accompanying it in a reproducing operation.

The invention is not to be limited to the exact arrangement of parts shown in the accompanying drawings and described in this specification as various changes in the detail of construction may be resorted to without departing from the spirit of the invention. Only particularly insofar as the invention has been pointed out in the accompanying claims is the same to be limited.

What is claimed is:

1. In an apparatus for applying serial characters to cards by means of perforations, a row of aligned punches each individual punch of which is solely representative of one denominational order of a multi-denominational serial character to be punched in selected adjacent card columns, means for aligning a card with said punches and for feeding the card in step-by-step fashion past the punches in rows in a columnar direction, electrically operable means for actuating each punch, a movable register unit for each punch capable of assuming different digit-representing positions, and means under the control of said units and effective when an index point in any of the selected card columns is aligned with a punch the position of whose register unit corresponds to the serial designation of said index point for operating the actuating means for said punch.

2. In an apparatus for applying serial characters to cards by means of perforations, a set of punches each individual punch of which is representative of one denominational order of a multi-denominational serial character to be punched in selected adjacent card columns, means for feeding the cards successively in step-by-step fashion past said punches in a columnar direction, means for actuating each punch, a multi-denominational registering device including a movable register unit for each punch capable of assuming different digit-representing positions, means for advancing said registering device under the control of said card feeding means, and means under the control of said units and effective when an index point in any of the selected card columns is aligned with a punch the position of whose register unit corresponds to the serial designation of said index point for operating the actuating means for said punch.

3. In an apparatus for applying serial characters to cards by means of perforations in selected adjacent card columns, a set of punches each individual punch of which is representative of one denominational order of a multi-digit serial character to be punched in the selected card columns, means for feeding a card in step-by-step fashion past said punches in a columnar direction, electromagnetic control instrumentalities for each punch, a movable register unit for each punch capable of assuming different digit-representing positions, and means under the control of said units and effective when an index point in any of the selected card columns is aligned with a punch the position of whose register unit corresponds to the serial designation of said index point for actuating the electromagnetic control instrumentality for that particular punch.

4. In an apparatus for applying serial characters to cards by means of perforations in selected adjacent card columns, a set of punches each individual punch of which is representative of one denominational order of a multi-digit serial character to be punched in the selected card columns, means for feeding the cards successively in step-by-step fashion past said punches in a columnar direction, electromagnetic control instrumentalities for each punch, a multi-denominational registering device including a movable register unit for each punch capable of assuming different digit-representing positions, means for advancing said registering device consecutively under the control of said card feeding means, and means under the control of said units and effective when an index point in any of the selected card columns of a card is aligned with a punch the position of whose register unit corresponds to the serial designation of said index point for actuating the electromagnetic control instrumentality for that particular punch.

5. In an apparatus for applying consecutive serial characters to cards by means of perforations therein, a set of punches each individual punch of which is representative of one denominational order of a multi-digit serial character to be punched in selected adjacent card columns, means for feeding the cards in step-by-step fashion past said punches successively in a columnar direction, electromagnetic control instrumentalities for each punch, a multi-denominational registering device including a register having a plurality of movable digit-representing units one for each punch and capable of assuming different digit-representing positions, means for advancing said registering device under the control of said card feeding means, means under the control of said units and effective when an index point in any of the selected card columns is aligned with a punch the position of whose register unit corresponds to the serial designation of said index point for actuating the electromagnetic control instrumentality for said punch, and means operable during each card feeding cycle of the apparatus for advancing said register one position.

6. In an apparatus for applying consecutive serial numbers to cards by means of perforations therein, a set of punches each of which is representative of one denominational order of a multi-digit serial number to be punched in selected adjacent card columns, means for feeding the cards in step-by-step fashion successively past said punches in a columnar direction, electromagnetic control instrumentalities for each punch, a multi-denominational registering device including a movable register unit for each punch capable of assuming different digit-representing positions, means for advancing said registering device under the control of said card feeding means, an operating circuit for each register unit and its respective control instrumentality and operable upon energization thereof to actuate the latter, means under the control of said units and effective when an index point in any of the selected card columns is aligned with a punch the position of whose register unit corresponds to the numerical designation of said index point, for energizing the circuit for that particular register unit.

7. In an apparatus for gang punching a group of detail cards under the initial control of a master card, a set of punches each of which is representative of one denominational order of a multi-digit serial number to be punched and selected in adjacent card columns, card sensing devices, means for feeding the cards in step-by-step fashion in a columnar direction successively first past said punches and then past the sensing devices with the master card leading, actuating means for each punch, a multi-denominational registering device including a movable register unit for each punch capable of assuming different digit-representing positions, means for advancing said registering device under the control of said card feeding means, means under the control of said units and effective when an index point in any of the selected columns of a detail card is aligned with a punch the position of whose register unit corresponds to the numerical designation of said index point for operating said punch-actuating means, and means under the control of said sensing devices for disabling said punch-actuating means when the master card is moved past said punches.

8. In an apparatus for gang punching a group of detail cards under the initial control of a master card, a set of punches each of which is representative of one denominational order of a multi-digit serial number to be punched and selected in adjacent card columns, card sensing devices, means for feeding the cards in step-by-step fashion in a columnar direction successively first past said punches and then past the sensing devices with the master card leading, actuating means for each punch, a multi-denominational registering device including a movable register unit for each punch capable of assuming different digit-representing positions, means for advancing said registering device under the control of said card feeding means, means under the control of said units and effective when an index point in any of the selected columns of a detail card is aligned with a punch the position of whose register unit corresponds to the numerical designation of said index point for operating said punch-actuating means, and means under the control of a special perforation in the master card for disabling said punch-actuating means as said master card passes said punches.

9. In an apparatus for gang punching groups of detail cards under the control of interspersed master cards, a set of punches each of which is representative of one denominational order of a multi-digit serial number to be punched in selected adjacent card columns, means for feeding the cards in step-by-step fashion successively in a columnar direction first past said punches and then past the sensing means with the master card leading, actuating means for each punch, a multi-denominational registering device including a movable register unit for each punch capable of assuming different digit-representing positions, means for advancing said registering device under the control of said card feeding means, means under the control of said units and effective when an index point in any of the selected columns of a detail card is aligned with a punch the position of whose register unit corresponds to the numerical designation of said index point for operating the actuating means for said punch, and means under the control of a special perforation in each of said master cards for disabling said punch-actuating means as said latter card passes said punches.

10. In an apparatus for gang punching groups of detail cards under the control of interspersed master cards, a set of punches each of which is representative of one denominational order of a multi-digit serial number to be punched in selected adjacent card columns, means for feeding the cards in step-by-step fashion successively in a columnar direction first past said punches and then past the sensing means with the master card leading, actuating means for each punch, a multi-denominational registering device including a movable register unit for each punch capable of assuming different digit-representing positions, means for advancing said registering device under the control of said card feeding means, means under the control of said units and effective when an index point in any of the selected columns of a detail card is aligned with a punch the position of whose register unit corresponds to the numerical designation of said index point for operating the actuating means for said punch, and means under the control of said sensing means and of a special perforation in each master card for rendering said punch-actuating means inoperative when the master card passes said punches.

11. In an apparatus for gang punching a group of detail cards under the initial control of a master card, a set of punches each of which is representative of one denominational order of a multi-digit serial number to be punched in selected adjacent card columns, card sensing devices, means for feeding the cards in step-by-step fashion successively in a columnar direction first past said punches and then past the sensing means with the master card leading, electromagnetic control instrumentalities for each punch, a multi-denominational registering device including a movable register unit for each punch capable of assuming different digit-representing positions, means for advancing said registering device under the control of said card feeding means, an operating circuit for each register unit and its respective control instrumentality and operable upon energization thereof to actuate the latter, means under the control of said units and effective when an index point in any of the selected detail card columns is aligned with the punch, the position of whose register unit corresponds to the numerical designation of said index point for energizing the circuit for that particular register unit, and means under the control of said sensing devices and a special perforation in the master card for preventing energization of any of said operating circuits when said master card passes said punches.

12. In an apparatus for gang punching a group of detail cards under the initial control of a master card, a set of punches each of which is representative of one denominational order of a multi-digit serial number to be punched in selected adjacent card columns, card sensing devices, means for feeding the cards in step-by-step fashion successively in a columnar direction first past said punches and then past the sensing means with the master card leading, electromagnetic control instrumentalities for each punch, a multi-denominational registering device including a movable register unit for each punch capable of assuming different digit-representing positions, means for advancing said registering device under the control of said card feeding means, an operating circuit for each register unit and its respective control instrumentality and operable upon energization thereof to actuate the latter, means under the control of said units and effective when an index point in any of the selected detail card columns is aligned with the punch the position of whose register unit corresponds to the numerical designation of said index point for energizing the circuit for that particular register unit, and means under the control of said sensing devices for preventing energization of any of said operating circuits when said master card passes said punches.

13. In an automatic continuously operable apparatus for punching a series of detail cards under the control of a set of pattern cards, a set of punches for perforating the detail cards, means for feeding the detail cards past said punches successively, means for actuating the punches under the control of said pattern cards, and means operable when a predetermined number of detail cards have been fed past said punches for terminating operation of the apparatus.

14. In an automatic continuously operable apparatus for punching a series of detail cards under the control of a set of pattern cards, a set of punches for perforating the detail cards, means for feeding the detail cards past said punches, means for actuating the punches under the control of said pattern cards, a multi-denominational register device including a plurality of registering units, means for advancing said device under the control of said card feeding means, and means operable when all of the units of said registering device have assumed a like predetermined digit-representing position for terminating operation of the apparatus.

15. In an automatic continuously operable apparatus for punching a series of detail cards under the control of a set of pattern cards, a set of punches for perforating the detail cards, means for feeding the detail cards past said punches successively, means for actuating the punches under the control of said pattern cards, a multi-denominational registering device including a plurality of registering units, each unit comprising a commutator device including a pair of commutator segments and a rotor, a brush carried by said rotor adapted when the rotor is in a predetermined position to bridge said commutator segments, means for periodically advancing said registering device under the control of said card feeding means, and means operable when all of said pairs of commutator segments have been bridged by their respective rotor brushes for terminating operation of the apparatus.

16. In a registering device, a plurality of register units each of which is representative of one order of a multi-denominational number and capable of assuming different digit-representing positions, each unit comprising a commutator device including a pair of commutator segments and a rotor having mounted thereon a brush adapted to bridge said segments when the rotor is in a predetermined digit-representing position, and a normally open work circuit, said pairs of segments being disposed in series in said work circuit whereby when all of them are bridged by their respective brushes the work circuit becomes closed.

17. In an electromagnetically operated registering device, a plurality of register units each of which is representative of one order of a multi-denominational number and capable of assuming ten different digit-representing positions from 0 to 9 inclusive, each unit comprising a commutator device including a pair of work circuit segments and a pair of carry circuit segments and a rotor having mounted thereon a brush adapted to bridge the work circuit segments when the rotor is in a predetermined position and to bridge the pair of carry circuit segments when the rotor is in its 9 digit-representing position, an electromagnet for each rotor adapted upon energization thereof to index the latter, a normally open circuit for each magnet, means electrically connecting one segment of each pair of carry circuit segments to the magnet circuit of its respective rotor, means electrically connecting the other segment thereof to the magnet circuit of the rotor of the next higher denominational order unit, a manually operable switch for each magnet circuit operable upon actuation thereof to close its respective magnet circuit, a normally open work circuit, said pairs of work circuit segments being disposed in series in said work circuit whereby when all of them are bridged by their respective brushes the work circuit becomes closed, and means operable upon actuation of each of said manually operable switches for opening the connection leading from the carry circuit to its respective magnet.

CLAIR D. LAKE.